US010116748B2

(12) United States Patent
Farmer et al.

(10) Patent No.: US 10,116,748 B2
(45) Date of Patent: Oct. 30, 2018

(54) VEHICLE-BASED MULTI-MODAL INTERFACE

(71) Applicant: Microsoft Technology Licensing, LLC, Redmond, WA (US)

(72) Inventors: Jason Ryan Farmer, Snohomish, WA (US); Mike Glass, Woodinville, WA (US); Vikram Padmakar Bapat, Kirkland, WA (US); Kristoffer S. Schultz, Redmond, WA (US); Oscar E. Murillo, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 109 days.

(21) Appl. No.: 14/549,496

(22) Filed: Nov. 20, 2014

(65) Prior Publication Data

US 2016/0150020 A1    May 26, 2016

(51) Int. Cl.
| H04L 29/08 | (2006.01) |
| B60K 37/06 | (2006.01) |
| G06F 3/16 | (2006.01) |
| H04M 1/60 | (2006.01) |
| H04M 1/725 | (2006.01) |

(52) U.S. Cl.
CPC .............. *H04L 67/12* (2013.01); *B60K 37/06* (2013.01); *G06F 3/167* (2013.01); *H04L 67/141* (2013.01); *H04M 1/6083* (2013.01); *H04M 1/6091* (2013.01); *H04M 1/7253* (2013.01); *G06F 2203/0381* (2013.01)

(58) Field of Classification Search
CPC ............ G01C 21/3608; G01C 21/3664; G01C 21/3492; G01C 21/36; G06F 2203/0381; G06F 3/0488; G06F 3/048; G10L 15/22; H04M 1/72577
See application file for complete search history.

(56) References Cited

U.S. PATENT DOCUMENTS

| 7,046,134 | B2 | 5/2006 | Hansen |
| 7,437,183 | B2 | 10/2008 | Makinen |
| 7,554,522 | B2 | 6/2009 | Sinclair, II et al. |
| 7,738,912 | B1 | 6/2010 | Hawkins et al. |
| 7,933,955 | B2 | 4/2011 | Khalatian |
| 8,015,005 | B2 * | 9/2011 | Ma ........................ G10L 15/26 704/236 |

(Continued)

FOREIGN PATENT DOCUMENTS

| KR | 20140094407 | 7/2014 |
| WO | WO-2013166801 | 11/2013 |

OTHER PUBLICATIONS

Terminal Mode Technical Architecture (Release Candidate v0.9, the precursor to MirrorLink, (see additionally wikipedia.org/wiki/MirrorLink Reference #11), pp. 1, 21 and 28-30, 2010.*

(Continued)

*Primary Examiner* — Matthew C Sams
(74) *Attorney, Agent, or Firm* — Klarquist Sparkman, LLP

(57) ABSTRACT

Various embodiments enable mobile devices, such as phones and the like, to integrate with an in-vehicle information/entertainment system to enable the user to control the in-vehicle information/entertainment system by way of their mobile phone. Users can leverage the functionality of their mobile phone to promote an in-vehicle experience which can be contextually tailored to the user's or the vehicle's context. Yet other embodiments can purvey an in-vehicle experience through a cloud based service.

17 Claims, 30 Drawing Sheets

(56) References Cited

U.S. PATENT DOCUMENTS

| | | | |
|---|---|---|---|
| 8,264,464 B2 | 9/2012 | Wong | |
| 8,570,189 B1* | 10/2013 | Casebolt | G08G 1/0112 340/901 |
| 8,660,849 B2 | 2/2014 | Gruber et al. | |
| 8,669,970 B2 | 3/2014 | Roethig et al. | |
| 8,731,814 B2 | 5/2014 | Schunder | |
| 8,744,645 B1* | 6/2014 | Vaghefinazari | G01C 21/3608 701/1 |
| 8,893,040 B2* | 11/2014 | Pascal | G06F 3/0482 715/764 |
| 9,218,805 B2* | 12/2015 | Elliott | G10L 15/00 |
| 2002/0022923 A1* | 2/2002 | Hirabayashi | G01C 21/3415 701/431 |
| 2003/0055735 A1 | 3/2003 | Cameron | |
| 2005/0027448 A1* | 2/2005 | Takenaga | G01C 21/3694 701/431 |
| 2005/0071081 A1* | 3/2005 | Hirose | G01C 21/20 701/414 |
| 2005/0114788 A1 | 5/2005 | Fabritius | |
| 2005/0275648 A1 | 12/2005 | Park | |
| 2006/0259942 A1 | 11/2006 | Toyama et al. | |
| 2007/0118775 A1 | 5/2007 | Cupps et al. | |
| 2008/0020753 A1 | 1/2008 | Glass et al. | |
| 2010/0079415 A1 | 4/2010 | Yang | |
| 2010/0079494 A1 | 4/2010 | Sung et al. | |
| 2010/0138780 A1 | 6/2010 | Marano et al. | |
| 2010/0162166 A1* | 6/2010 | Pascal | G06F 3/0482 715/810 |
| 2011/0022393 A1* | 1/2011 | Waller | G01C 21/3608 704/270 |
| 2011/0078637 A1 | 3/2011 | Inderrieden et al. | |
| 2011/0165551 A1* | 7/2011 | Yamazaki | G01C 21/36 434/365 |
| 2012/0077586 A1 | 3/2012 | Pishevar | |
| 2012/0088548 A1 | 4/2012 | Yun et al. | |
| 2012/0166076 A1* | 6/2012 | Hardy | G01C 21/3415 701/414 |
| 2012/0265528 A1* | 10/2012 | Gruber | G10L 15/18 704/235 |
| 2012/0268294 A1* | 10/2012 | Michaelis | G06F 9/4443 340/905 |
| 2012/0287058 A1 | 11/2012 | Lee | |
| 2012/0303263 A1 | 11/2012 | Alam et al. | |
| 2013/0113993 A1 | 5/2013 | Dagit, III | |
| 2013/0155237 A1 | 6/2013 | Paek et al. | |
| 2013/0258037 A1 | 10/2013 | Kim et al. | |
| 2013/0275875 A1* | 10/2013 | Gruber | G10L 15/22 715/728 |
| 2013/0275899 A1* | 10/2013 | Schubert | G06F 3/0481 715/765 |
| 2013/0278484 A1 | 10/2013 | Hwang et al. | |
| 2014/0118222 A1 | 5/2014 | Barrett et al. | |
| 2014/0129695 A1 | 5/2014 | Yerli | |
| 2014/0229836 A1 | 8/2014 | Young | |
| 2014/0267035 A1 | 9/2014 | Schalk et al. | |
| 2014/0370959 A1* | 12/2014 | Yacenda | G07F 17/3241 463/18 |
| 2015/0365513 A1* | 12/2015 | Lee | H04M 1/72569 455/418 |
| 2015/0382394 A1* | 12/2015 | Tiedje | H04W 24/08 370/216 |
| 2016/0028870 A1* | 1/2016 | Lee | H04M 1/72527 455/420 |
| 2016/0044519 A1* | 2/2016 | Bai | H04W 48/18 370/252 |

OTHER PUBLICATIONS

International Search Report and Written Opinion from counterpart International Application No. PCT/US2015/060775, dated Feb. 25, 2016, 11 pages.

"AllCast", Retrieved from <https://play.google.com/store/apps/details?id=com.koushikdutta.cast&hl=en> on Oct. 28, 2014, Oct. 18, 2014, 4 pages.

"AVATRON—Frequently Asked Questions Air Display", Retrieved from <http://www.avatron.com/support/faq-air-display/#toggle-id-14> on Oct. 28, 2014, Feb. 11, 2014, 16 pages.

"Car Navigation System", Available at: <http://www.navigation.com/is-bin/intershop.static/WFS/Navteq-Site/Navteq/en_GB/documents/Hyundai/Vehicle%20Manuals/Veloster/Veloster_Car%20navigation%20system_ENGLISH.pdf>, 70 Pages.

"CLA 2014", Available at: <https://www.mbusa.com/vcm/MB/DigitalAssets/pdfmb/brochures/2014_CLA.pdf>, Sep. 17, 2013, 42 Pages.

"Google Cast Design Checklist", Retrieved from <https://developers.google.com/cast/docs/design_checklist> on Oct. 28, 2014, Mar. 10, 2014, 34 pages.

"Google Cast", Retrieved From: <https://chrome.google.com/webstore/detail/google-cast/boadgeojelhgndaghljhdicfkmllpafd?hl=en> Sep. 29, 2014, Sep. 15, 2014, 1 pages.

"Hands on the Wheel, Eyes on the Road", Retrieved From: <http://www.nuance.com/for-business/mobile-solutions/dragon-drive/index.htm> Jul. 24, 2014, Oct. 14, 2013, 5 Pages.

"How to Use Dragon Drive! Messaging in Your New BMW", Retrieved From: <http://www.youtube.com/watch?v=_nZyviNFuz4> Jul. 24, 2014, Jul. 9, 2012, 2 Pages.

"Sling Player for Connected Devices", Retrieved From: <http://uk.slingbox.com/go/spcd> Sep. 17, 20214, Nov. 27, 2013, 3 pages.

Basu, "Device Mirroring Options for Mobile Developers", Retrieved from <http://developer.telerik.com/featured/mirroring-options-mobile-developers/> on Nov. 11, 2014, Jul. 23, 2014, 13 pages.

Baur, et al., "Virtual Projection: Exploring Optical Projection as a Metaphor for Multi-Device Interaction", In Proceedings: The CHI Conference on Human Factors in Computing Systems, May 5, 2012, 10 pages.

Brian, "Hands-on With Apple's CarPlay: When Siri Met Ferrari (Video)", Retrieved From: <http://www.engadget.com/2014/03/04/apple-carplay-ferrari-ff-hands-on/> Jul. 24, 2014, Mar. 4, 2014, 14 Pages.

Brink, "How to Change Screen Orientation in Windows 8 and 8.1", Retrieved from <http://www.eightforums.com/tutorials/30628-screen-orientation-change-windows-8-a.html> on Oct. 28, 2014, Sep. 1, 2013, 7 pages.

Dube, "Finally Get Two Functional Desktops With Actual Multiple Monitors", Retrieved from <http://www.makeuseof.com/tag/finally-get-two-functional-desktops-with-actual-multiple-monitors/> on Nov. 11, 2014, Jul. 24, 2013, 13 pages.

Gowan, et al., "How to Stream Video to a TV from a Mobile Device or Computer", Retrieved from <http://www.tomsguide.com/us/how-to-stream-to-tv,news-18335.html> on Oct. 28, 2014, Oct. 14, 2014, 17 pages.

Greenberg, et al., "PDAs and Shared Public Displays: Making Personal Information Public, and Public Information Personal", In Proceedings of Personal Technologies, Mar. 1999, 11 pages.

Grolaux, et al., "Attach Me, Detach Me, Assemble Me Like You Work", In Proceedings: The IFIP TC13 International Conference, Sep. 12, 2005, 14 pages.

Itzkovitch, "Designing for Device Orientation: From Portrait to Landscape", Retrieved from <http://www.smashingmagazine.com/2012/08/10/designing-device-orientation-portrait-landscape/> on Oct. 28, 2014, Aug. 10, 2012, 11 pages.

Johnston, "Multimodal Interfaces", Retrieved From: <http://www2.research.att.com/~johnston/> Jul. 22, 2014, 2011, 3 Pages.

Schmidt, et al., "A Cross-Device Interaction Style for Mobiles and Surfaces", In Proceedings: The Designing Interactive Systems Conference, Jun. 11, 2012, 10 pages.

Seifert, et al., "Extending Mobile Interfaces with External Screens", In Proceedings: International Federation for Information Processing, Sep. 2, 2013, 8 pages.

Sinofsky, "Enhancing Windows 8 for multiple monitors", Retrieved from <http://blogs.msdn.com/b/b8/archive/2012/05/21/enhancing-windows-8-for-multiple-monitors.aspx> on Nov. 11, 2014, May 21, 2012, 44 pages.

(56) References Cited

OTHER PUBLICATIONS

Second Written Opinion received in counterpart PCT Application No. PCT/US2015/060775, dated Nov. 10, 2016, 7 pages.
International Preliminary Report on Patentability, from counterpart PCT Application No. PCT/US2015/060775, dated Feb. 14, 2017, 8 pages.

* cited by examiner

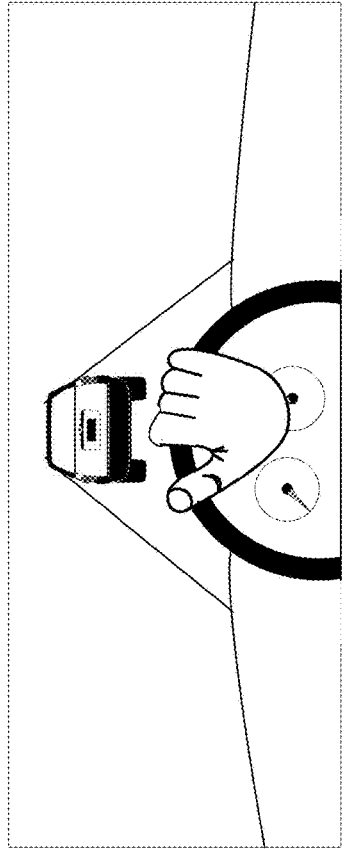

Fig. 11

◎: How can I help?

👤: What's my day like?

◎: You have a meeting at 10 with your banker. Hear more?

👤: No thanks.

◎: You have a text from your brother. Do you want to hear it?

👤: Yes.

◎: How can I help?

👤: Read the latest message from my brother.

◎: "Hey Bro -- let's have dinner tonight." Reply, call back, or are you done?

👤: Reply.

◎: What's your reply?

👤: Sure. Eight o'clock. I'll make reservations and let you know.

◎: Send it, add more, or try again?

👤: Send it.

◎: Your message was sent

👤: How can I help?

◎: Remind me to make a dinner reservation when I get to work.

👤: Okay. I'll remind you to make a dinner reservation when you get to work. Is that right?

◎: Yes.

👤: Great. I added the reminder.

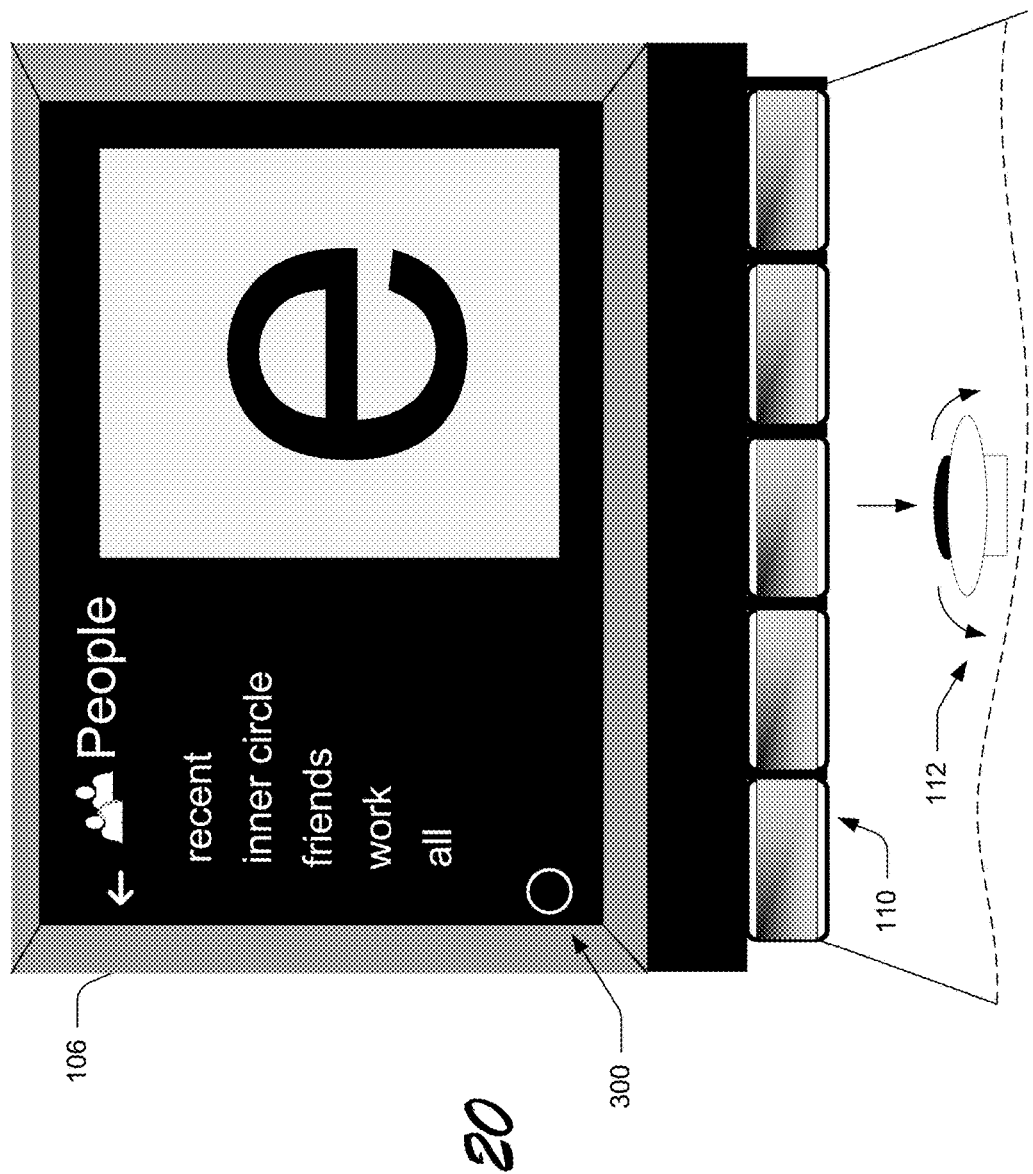

VEHICLE-BASED MULTI-MODAL INTERFACE

BACKGROUND

To date, many in-vehicle information/entertainment systems have been frustrating to drivers and other users for reasons including the difficulty associated with using the systems, as well as inconsistencies between systems from vehicle-to-vehicle. As such, the user experience has not been the best that it could be and the demand continues for improved in-vehicle systems that provide safe, consistent, and desirable user experiences.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments enable mobile devices, such as phones and the like, to integrate with an in-vehicle information/entertainment system to enable the user to control the in-vehicle information/entertainment system by way of their mobile phone. Users can leverage the functionality of their mobile phone to promote an in-vehicle experience which can be contextually tailored to the user's or the vehicle's context. Yet other embodiments can purvey an in-vehicle experience through a cloud based service.

In at least some embodiments, a user can complete various tasks using multiple different modalities with smooth continuous modal handoffs between the modalities. The modalities can include voice, touch, gestures, NUI gestures, gaze, and controls such as a jog dial. Smooth modal handoffs permit the user to easily change their input modality depending on their context.

Other embodiments can tailor the voice-only experience based on drive scenarios and the user's cognitive load. Yet other embodiments can tailor the user experience for jog dial, gestures, gaze and touchscreen modalities.

Further embodiments can provide an adaptive user interface including an adaptive user interface that can operate in connection with multiple different types of screens, e.g., a phone screen, a cluster screen, a console screen, and a heads up display (HUD) screen, and the like. Still further embodiments provide a universal command/control model for multiple types of physical input including button jogs, capacitive dials, hard keys, pads, and the like.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 11 is a diagram that illustrates a verbal dialog between a user and an in-vehicle system in accordance with one or more embodiments.

FIG. 20 illustrates a system in accordance with one or more embodiments.

DETAILED DESCRIPTION

Overview

Various embodiments enable mobile devices, such as phones and the like, to integrate with an in-vehicle information/entertainment system to enable the user to control the in-vehicle information/entertainment system by way of their mobile phone. Users can leverage the functionality of their mobile phone to promote an in-vehicle experience which can be contextually tailored to the user's or the vehicle's context. Yet other embodiments can purvey an in-vehicle experience through a cloud based service.

In at least some embodiments, a user can complete various tasks using multiple different modalities with smooth continuous modal handoffs between the modalities. The modalities can include voice, touch, gestures, NUI gestures, gaze and controls such as a jog dial. Smooth modal handoffs permit the user to easily change their input modality depending on their context.

Other embodiments can tailor the voice-only experience based on drive scenarios and the user's cognitive load. Yet other embodiments can tailor the user experience for jog dial and touchscreen modalities. Further embodiments can provide an adaptive user interface including an adaptive user interface that can operate in connection with multiple different types of screens, e.g., a phone screen, a cluster screen, a console screen, and a heads-up display (HUD) screen. Still further embodiments provide a universal command/control model for multiple types of physical input including button jogs, capacitive dials, hard keys, pads, and the like.

In the following discussion, an example environment is first described that is operable to employ the techniques described herein. The techniques may be employed in the example environment, as well as in other environments.

Example Environment

Figure 1:
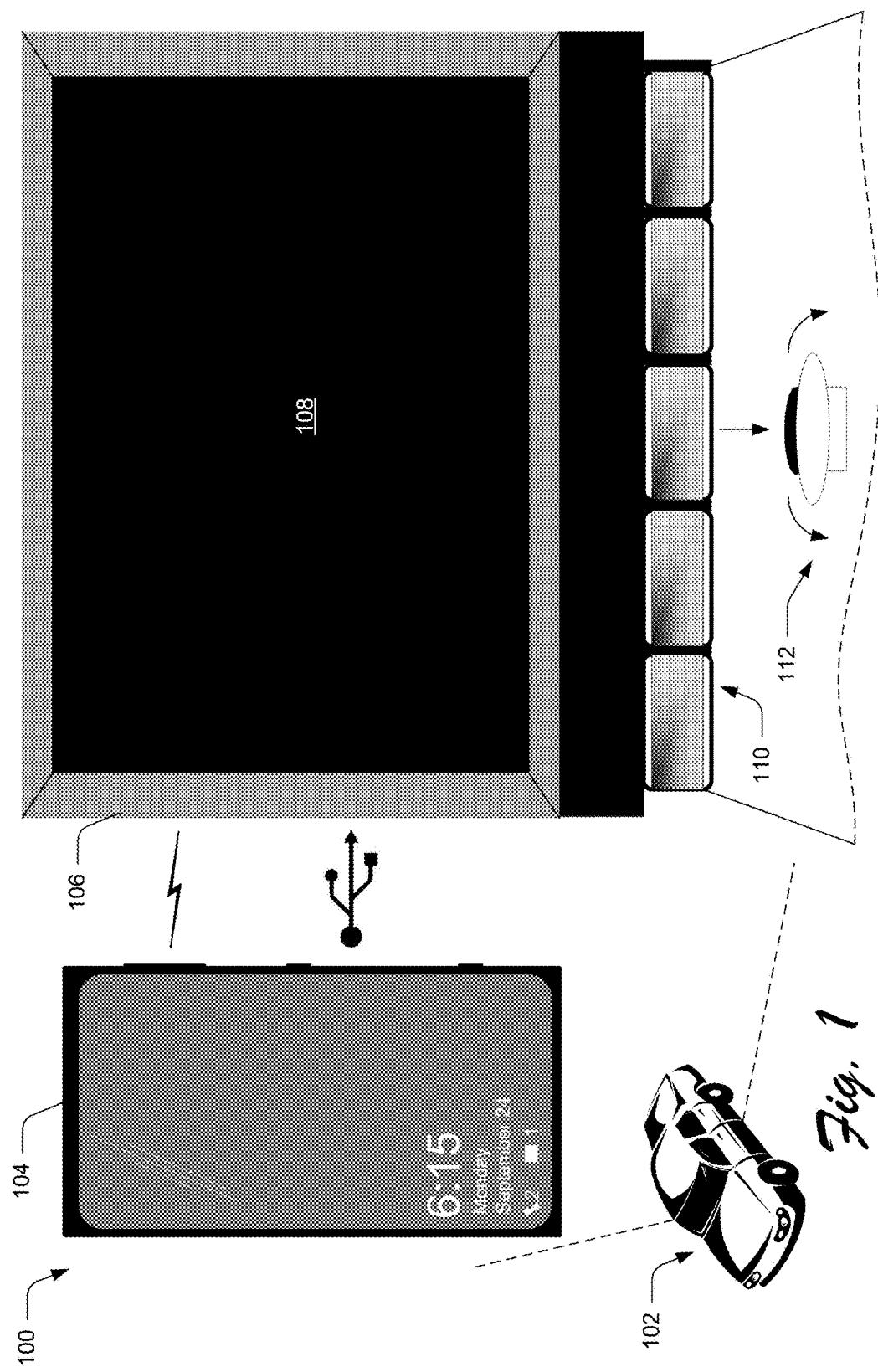
FIG. 1 illustrates an example operating environment in accordance with one or more embodiments.

FIG. 1 illustrates an example environment 100 in an example implementation that is operable to employ the techniques described herein. The illustrated environment 100 includes a vehicle 102, a mobile computing device in the form of a phone 104, and a vehicle console 106 having a display device 108. The console 106 is shown removed from vehicle 102 for the purpose of the description that follows. The console 106 typically resides on or slightly below the dashboard between the driver's seat and the front passenger's seat. The console's display device 108 is or can be touch-enabled so that it can receive touch input to, for example, enable a user to make content selections. Beneath console 106, a number of buttons are provided and are shown generally at 110. In addition, vehicle 102 can include a jog dial 112 that can serve as an input device for console 106. The jog dial 112 can be used to navigate and make content selections for content that is displayed on display device 108. The jog dial can be rotated in a clockwise direction and a counterclockwise direction into and out of the plane of page upon which the jog dial appears, as indicated by the two arced arrows. Rotating the jog dial in this manner permits the user to navigate content displayed on display device 108. In addition, the jog dial also includes a mechanism that can be pressed downward in the direction of the downward-pointing arrow, to make a selection.

It is to be appreciated and understood that in the description below, although a mobile device in the form of a phone is used to describe the context of the inventive embodiments, other mobile devices can be used without departing from the spirit and scope of the claimed subject matter.

Accordingly, for a displayed arrangement of content, such as tiles, icons, objects and the like, rotating the jog dial allows for navigation of the displayed content and pressing the jog dial downward selects a particular piece of content. So, for example, if display device 108 displays a playlist having a number of different songs, the user can navigate the songs using the jog dial and, when a particular song of interest is located, by depressing the jog dial the user can select a song to play.

In operation, phone 104 can connect with console 106 to enable the user to interact with content by way of the console. Any suitable type of connection can be used. In the illustrated and described embodiment, phone 104 can connect with the console 106 through a wireless connection such as a Wi-Fi or Bluetooth connection. Alternately or additionally, the phone 104 can connect with the console 106 through a USB connection, as indicated in the figure.

When connected with the console 106, the mobile phone can integrate with the vehicle's information/entertainment system to enable the user to control the in-vehicle information/entertainment system by way of their mobile phone. Users can leverage the functionality of their mobile phone to promote an in-vehicle experience which can be contextually tailored to the user's or the vehicle's context, as will become apparent below.

Figure 2:
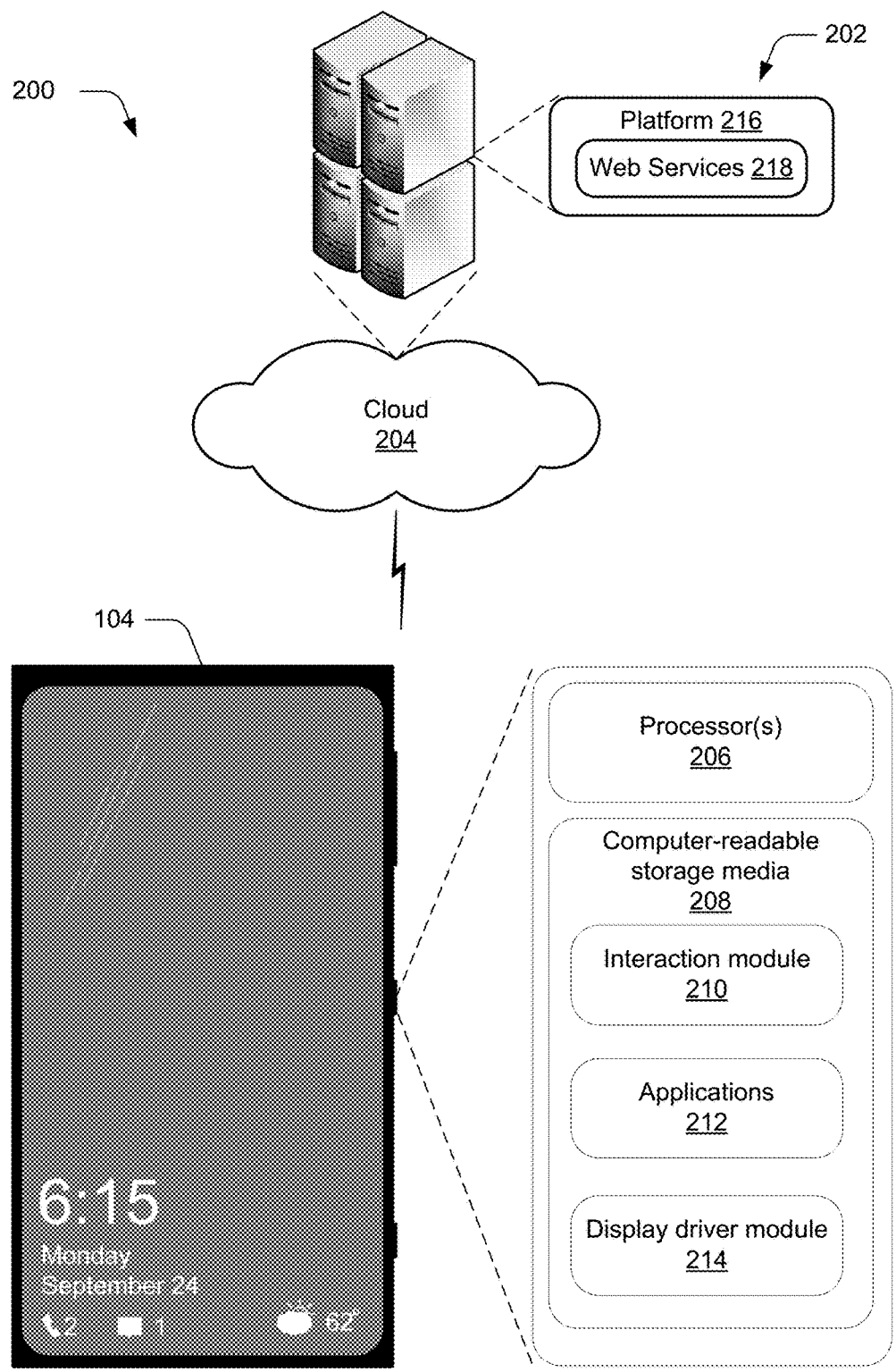
FIG. 2 illustrates a system in accordance with one or more embodiments.

FIG. 2 illustrates phone 104 in a computing environment 200 that can include the vehicle 102 (not shown) and its associated console 106. The computing environment 200 also includes one or more servers 202 and a network 204 (illustrated as the "cloud") through which the phone 104, console 106 and the servers 202 can communicate. The network, for example, can facilitate communication with various entities such as companies hosting content provision services, OEMs, and any other entities that are connected by way of the Internet.

In the illustrated and described example, phone 104 includes, among other components, one or more processors 206, one or more computer readable storage media 208, an interaction module 210, various applications 212, and a display driver module 214.

In the illustrated and described example, interaction module 210 includes functionality that enables voice recognition and audio voice prompting of the user. The interaction module provides a personal assistant to assist the user in accomplishing tasks. So, for example, the interaction module 210 can recognize words that are spoken by the user such as commands, queries, and the like. In addition, interaction module 210 includes functionality that enables actions to be taken with respect to items of communication that it receives. For example, a user may prompt their phone by asking "Please tell me if I have any meetings scheduled for today." Responsive to receiving this request, the interaction module 210, in cooperation with, for example, a calendar application, can ascertain whether there are any meetings scheduled for today and respond verbally to the user "You have no meetings scheduled for today."

Applications 212 can comprise any suitable type of application that can reside on phone 104. Such applications include, by way of example and not limitation, social networking applications, e-mail applications, text applications, calendar applications, media player applications, news, sports, and weather applications, and the like.

Display driver module 214 includes functionality that enables a display to be rendered on phone 104, as well as on the console's display device 108. In operation, the display driver module 214 can ascertain properties associated with the console's display device 108 (e.g. display device dimensions) and make rendering decisions based on the ascertained properties, as will become apparent below.

Servers 202 are illustrated as including a platform 216 for web services 218. Web services 218 can include any suitable type of web service. The servers 202 and their associated Web services 218 can generate communications that are provided to phone 104 by way of network 204. When the communications are received, the communications are processed by the phone 104 and/or an associated application executing on the phone, and the user can be notified of the communication.

The platform 216 abstracts underlying functionality of hardware (e.g., servers) and software resources of the cloud and thus may act as a "cloud operating system." For example, the platform 216 may abstract resources to enable communication between various computing devices. The platform 216 may also serve to abstract scaling of resources to provide a corresponding level of scale to encountered demand for the web services 218 that are implemented via the platform 216. A variety of other examples are also contemplated, such as load balancing of servers in a server farm, protection against malicious parties (e.g., spam, viruses, and other malware), and so on.

Thus, the cloud is included as a part of the strategy that pertains to software and hardware resources that are made available to the computing devices via the Internet or other networks.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices.

For example, the phone may also include an entity (e.g., software) that causes hardware or virtual machines of the computing device to perform operations, e.g., processors, functional blocks, and so on. For example, the computing device may include a computer-readable medium that may be configured to maintain instructions that cause the computing device, and more particularly the operating system and associated hardware of the computing device to perform operations. Thus, the instructions function to configure the operating system and associated hardware to perform the operations and in this way result in transformation of the operating system and associated hardware to perform functions. The instructions may be provided by the computer-readable medium to the computing device through a variety of different configurations.

One such configuration of a computer-readable medium is a signal bearing medium and thus is configured to transmit the instructions (e.g., as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

In the discussion that follows, a section entitled "Completing a Task through Multi-Modal Input" describes how tasks can be smoothly accomplished using different types of modal input in accordance with one or more embodiments. Following this, a section entitled "Tailoring Voice-Only Experiences" describes how voice only experiences can be provided in accordance with one or more embodiments. Next, a section entitled "Tailoring the User Experience for Jog Dial and Touchscreen" describes how the user experience can be tailored or otherwise adapted for different types of modal inputs. Following this, a section entitled "Adaptive User Interface" describes an adaptive user interface in accordance with one or more embodiments. Next, a section entitled "Adaptive User Interface Using Multiple Screens" describes how a user interfaces can be adapted in accordance with multiple screens. Following this, a section entitled "Universal Command/Control Model" describes a model that utilizes universal commands and controls in accordance with one or more embodiments. Last, a section entitled "Example Device" describes aspects of an example device that can be utilized to implement one or more embodiments.

Having considered an example operating environment, consider now the notion of a multi-modal input to complete a task in accordance with one or more embodiments.

Completing a Task Through Multi-Modal Input

As noted above, in at least some embodiments, a user can complete various tasks using multiple different modalities with smooth continuous modal handoffs between the modalities. The modalities can include voice, touch, gestures, NUI gestures, gaze and controls such as a jog dial. Smooth modal handoffs permit the user to easily change their input modality depending on their context. That is, the user is able to naturally move between these different input modalities in any suitable combination. For example, the user can smoothly move between (1) voice and touch, (2) voice and jog dial, (3) voice, touch, and jog dial or any combination of these and other modalities.

It is to be appreciated and understood that actions associated with a particular task can be performed using different modalities depending on a user's context. For example, one task may involve a certain action. This action might be performed using a voice modality, for example, "Play the next music track." Alternately or additionally, this action might be performed using touch input as by a user touch-selecting the next music track displayed on the console's display device. Alternately or additionally, this action might be performed by a user navigating to the next music track with the jog dial and then depressing the jog dial to select the next music track. Depending on the user's context, the user is free to choose which modality to use. So, for example, in busy traffic the user may simply make their selection using the voice modality. On the other hand, if the user is at a stoplight or in a parking lot, they may choose to use touch input or the jog dial to make or perform the same action.

Voice and Touch

Figure 3:
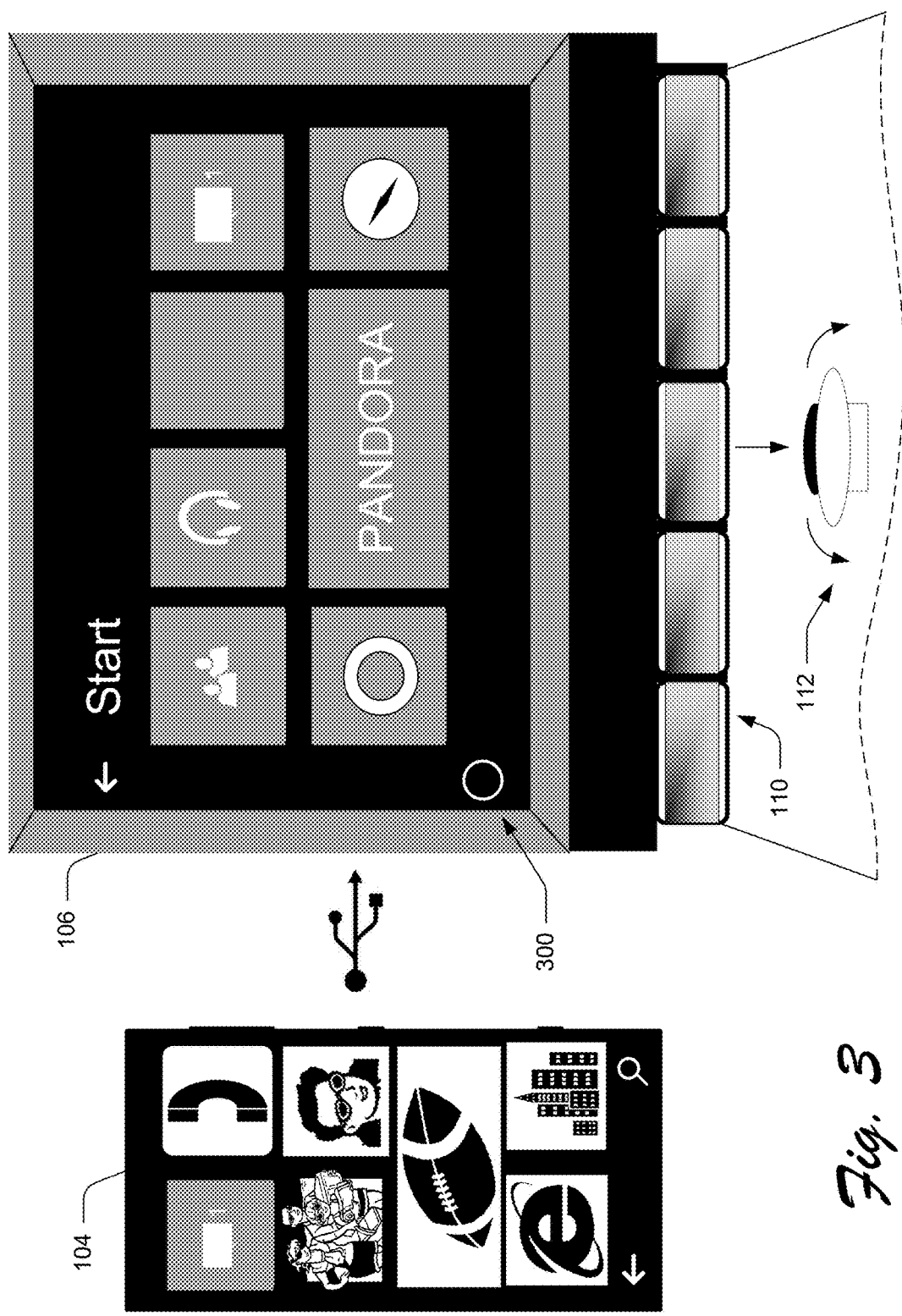
FIG. 3 illustrates a system in accordance with one or more embodiments.

As an example, consider FIG. 3 in which like numerals have been utilized to depict like components. In this example, the user has entered their car and connected their phone 104 to console 106 by way of a USB connection. Upon doing so, a so-called "drive mode" instrumentality 300 appears in the form of a circle. The drive mode instrumentality enables the user to touch-select the console's display device to interact with drive mode functionality. A start screen also appears on the console's display device and includes a number of objects which, in this example, comprise tiles. It is to be appreciated and understood that any suitable type of objects can be displayed on the console's display device. As such, tiles constitute but one example of such an object.

Figure 4:
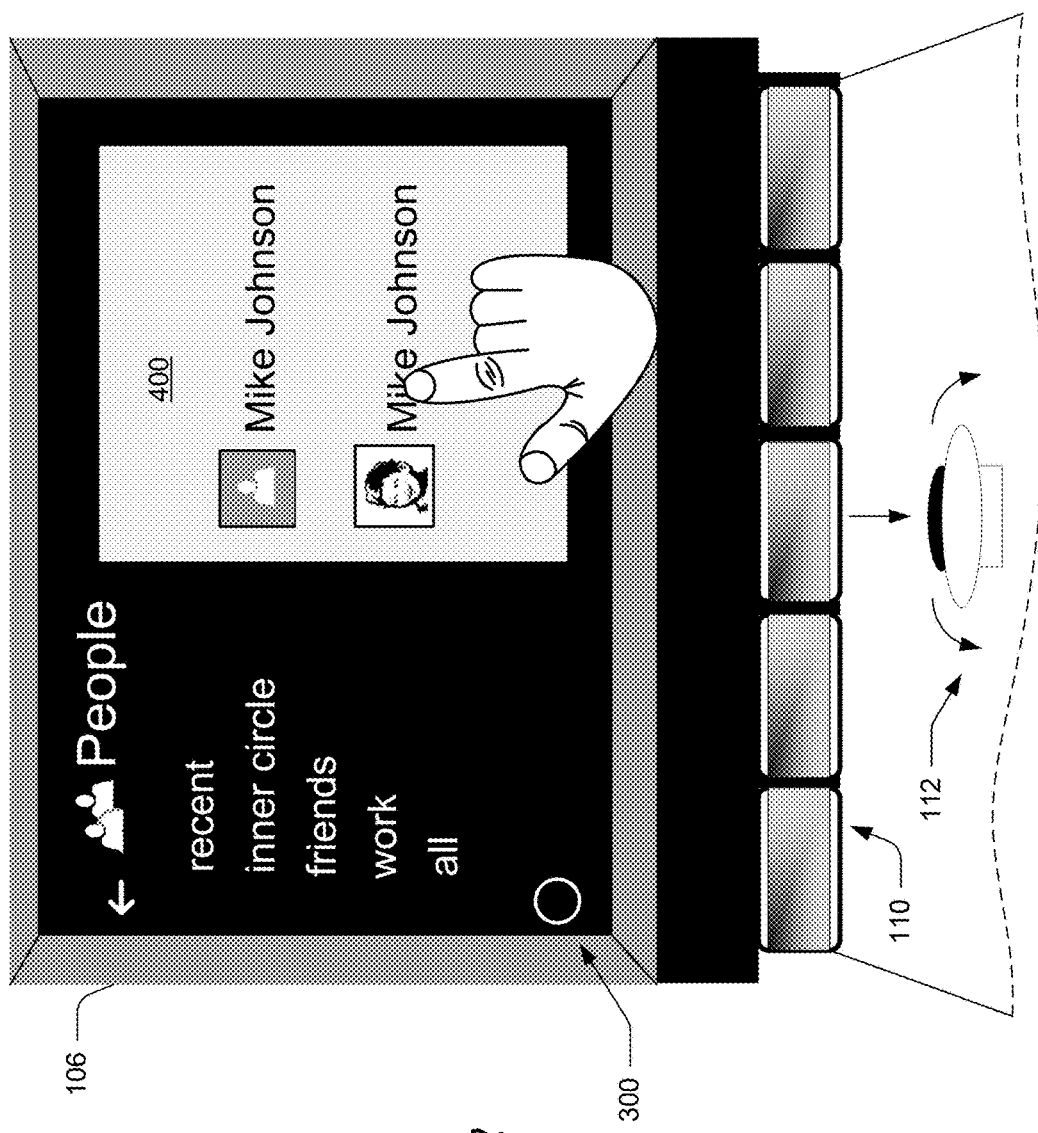
FIG. 4 illustrates a system in accordance with one or more embodiments.

In this example, the user uses their voice to say "Call Mike Johnson". This audio input is received by the interaction module 210 (FIG. 2) on phone 104. Consequently, the interaction module interacts with the "Contacts" application on phone 104 to retrieve Mike Johnson's contact information. While doing so, the interaction module notices that there are two Mike Johnson entries in the user's Contacts. The interaction module 210 then prompts the user by saying "There are two Mike Johnsons—which one would you like to call?" In connection with this audio prompt, the display driver module 214 of phone 104 can cause a user interface to be displayed on the console's device display to permit the user to select the desired callee. As an example, consider FIG. 4 which illustrates a user interface that includes a "People" category with a number of touch-selectable choices including "recent", "inner circle", "friends", "work", and "all". In addition, a display portion 400 lists the two selectable "Mike Johnson" entries. Accordingly, the user can touch select the correct Mike Johnson to initiate the call experience. This can include subsequent presentation of a user interface to enable the user to touch select to either call a mobile phone, work phone, voice over IP (VoIP) number.

Accordingly, in this particular example, the user has used voice input to cause a search to be conducted by their phone 104. The search of the user's contacts on the phone resulted in an ambiguity. The phone 104 then caused a user interface to be displayed on the console's display device to enable the user to disambiguate the ambiguity through touch input. In this manner, different input modalities have been utilized together to complete a task.

Voice and Jog Dial

Similar functionality to that described above can be provided in connection with a jog dial in place of a touch input. As an example, consider FIG. 5 in which like numerals have been utilized to depict like components.

Figure 5:
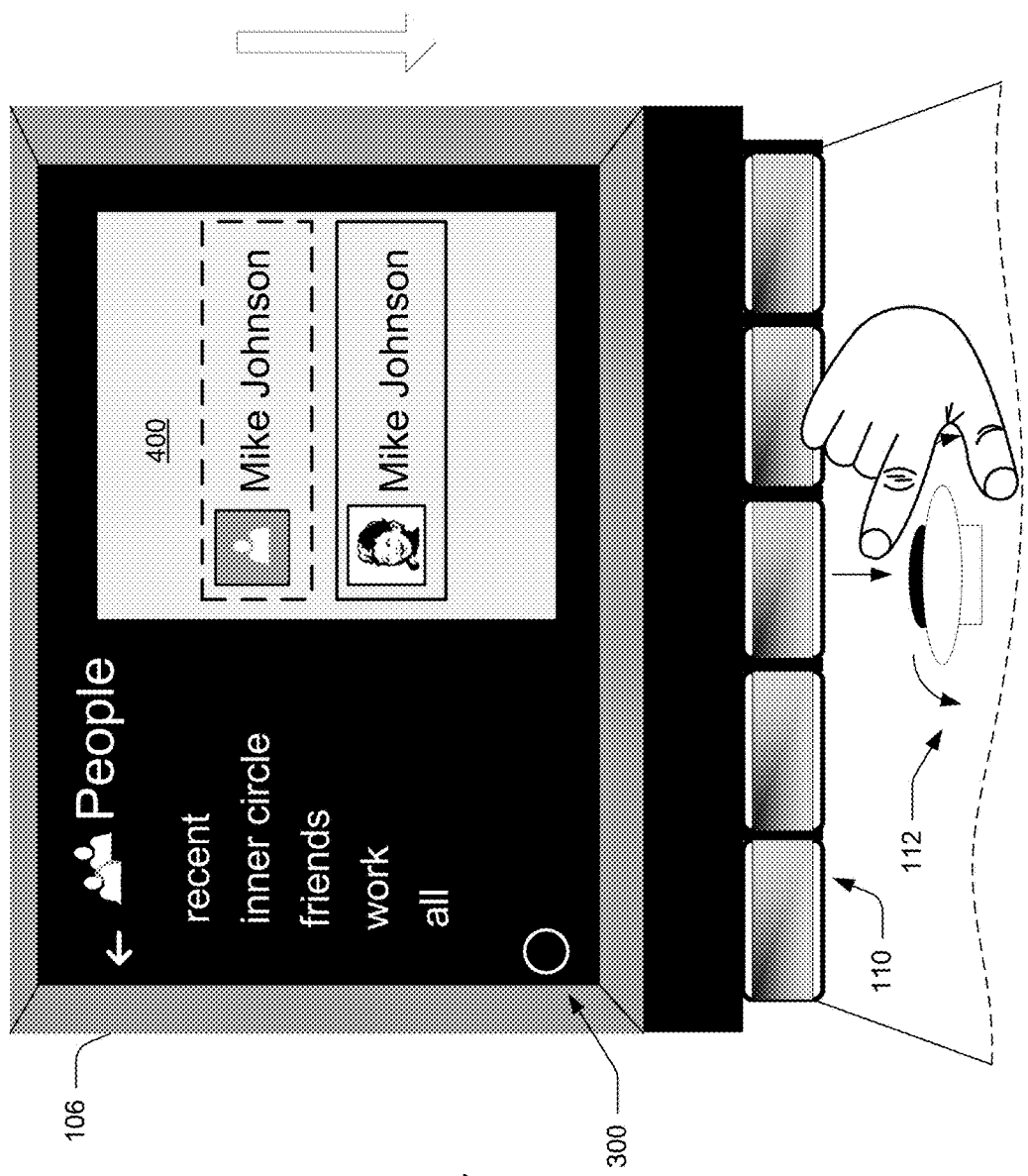
FIG. 5 illustrates a system in accordance with one or more embodiments.

Similar to the example above, the user uses their voice to say "Call Mike Johnson". This audio input is received by the interaction module 210 (FIG. 2) on phone 104. Consequently, the interaction module interacts with the "Contacts" application on phone 104 to retrieve Mike Johnson's contact information. While doing so, the interaction module notices that there are two Mike Johnson entries in the user's Contacts. The interaction module 210 then prompts the user by saying "There are two Mike Johnsons—which one would you like to call?" In connection with this audio prompt, the display driver module 214 of phone 104 can cause a user interface to be displayed on the console's device display to permit the user to select the desired callee as shown in FIG. 5. In this particular example, the first "Mike Johnson" that appears in the list is framed with a user interface instrumentality—here, a rectangle—indicating that it can be selected. By rotating the jog dial, the user has navigated the user interface instrumentality from the first-listed "Mike Johnson" (indicated by the dashed rectangle) to the second-listed "Mike Johnson" (indicated by the solid rectangle). Now, the user can simply select the second-listed "Mike Johnson" by depressing the jog dial in the direction of the downward arrow. This can initiate a call to the intended callee. Alternately or additionally, a subsequent user experience can be provided that can include subsequent presentation of a user interface to enable the user to touch select to either call a mobile phone, work phone, voice over IP (VoIP) number.

Accordingly, in this particular example, the user has used voice input to cause a search to be conducted by their phone 104. The search of the user's contacts on the phone resulted in an ambiguity. The phone 104 then caused a user interface to be displayed on the console's display device to enable the user to disambiguate the ambiguity through the use of the jog dial. In this manner, different input modalities have been utilized together to complete a task.

Voice, Touch, and Jog Dial

Figure 6:
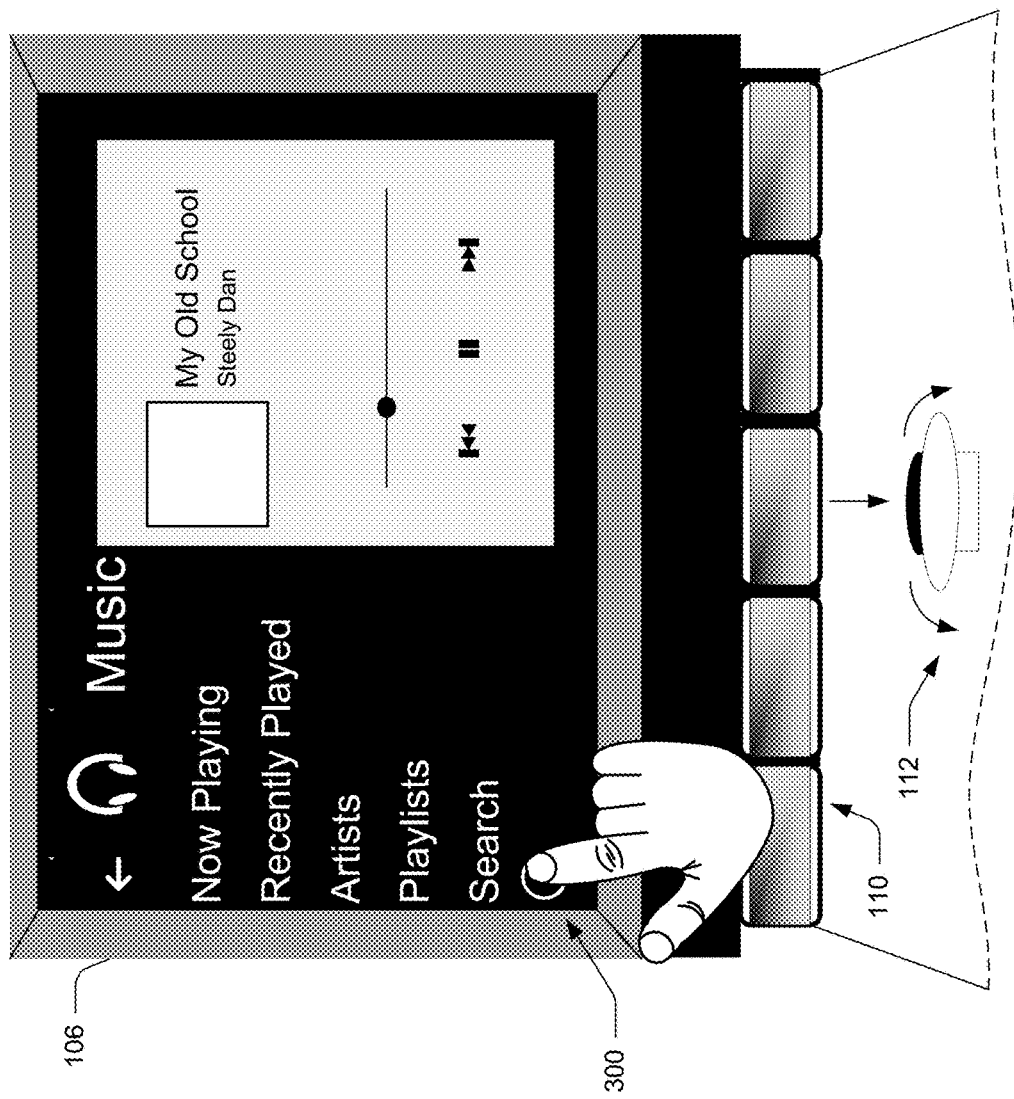
FIG. 6 illustrates a system in accordance with one or more embodiments.
Figure 7:
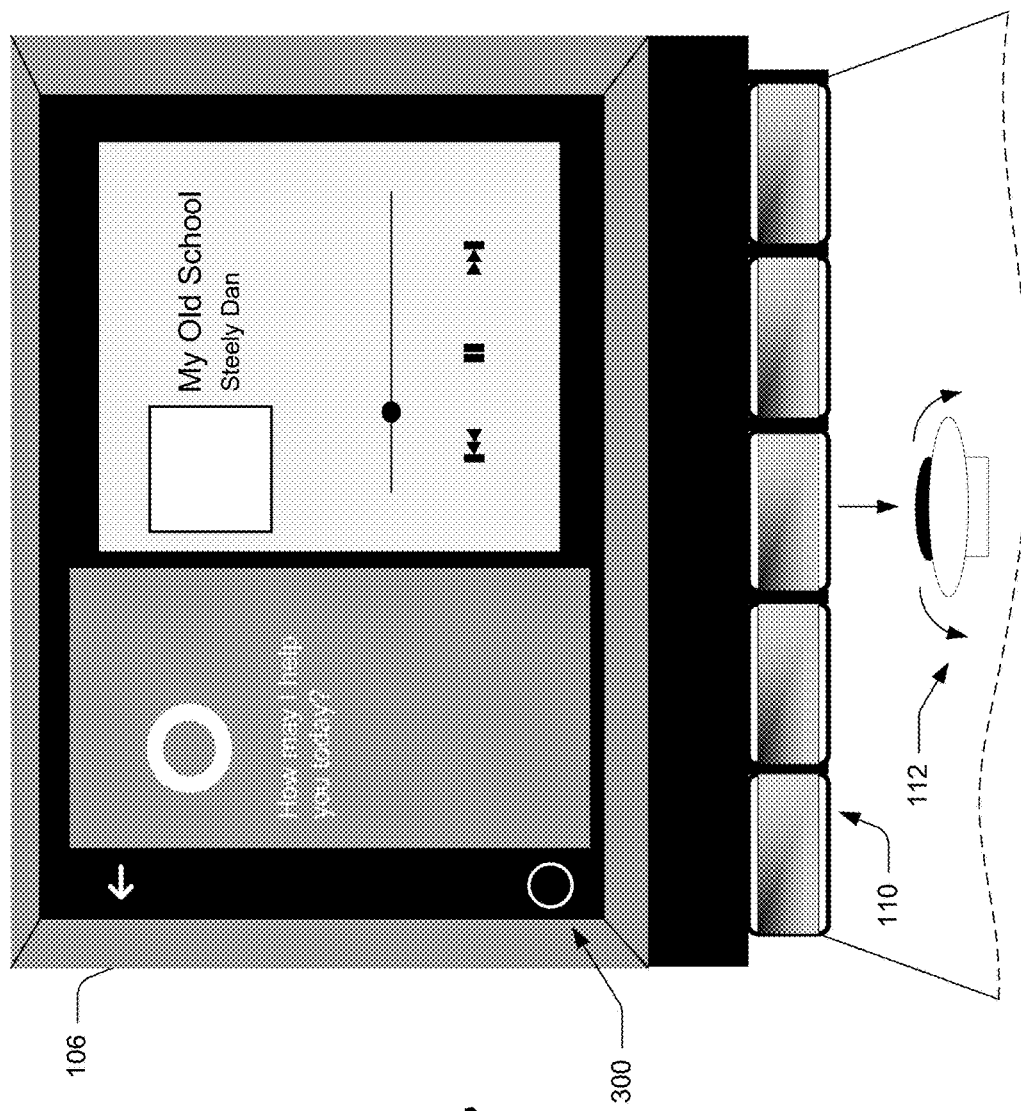
FIG. 7 illustrates a system in accordance with one or more embodiments.

In at least some embodiments, the user may move freely between input modalities that include voice, touch, and the jog dial. As an example, consider FIG. 6 where the user has touch-selected the drive mode user instrumentality 300 to enter drive mode. Upon entering drive mode, the user is verbally prompted by the system, "How may I help you?" as shown in FIG. 7.

Figure 8:
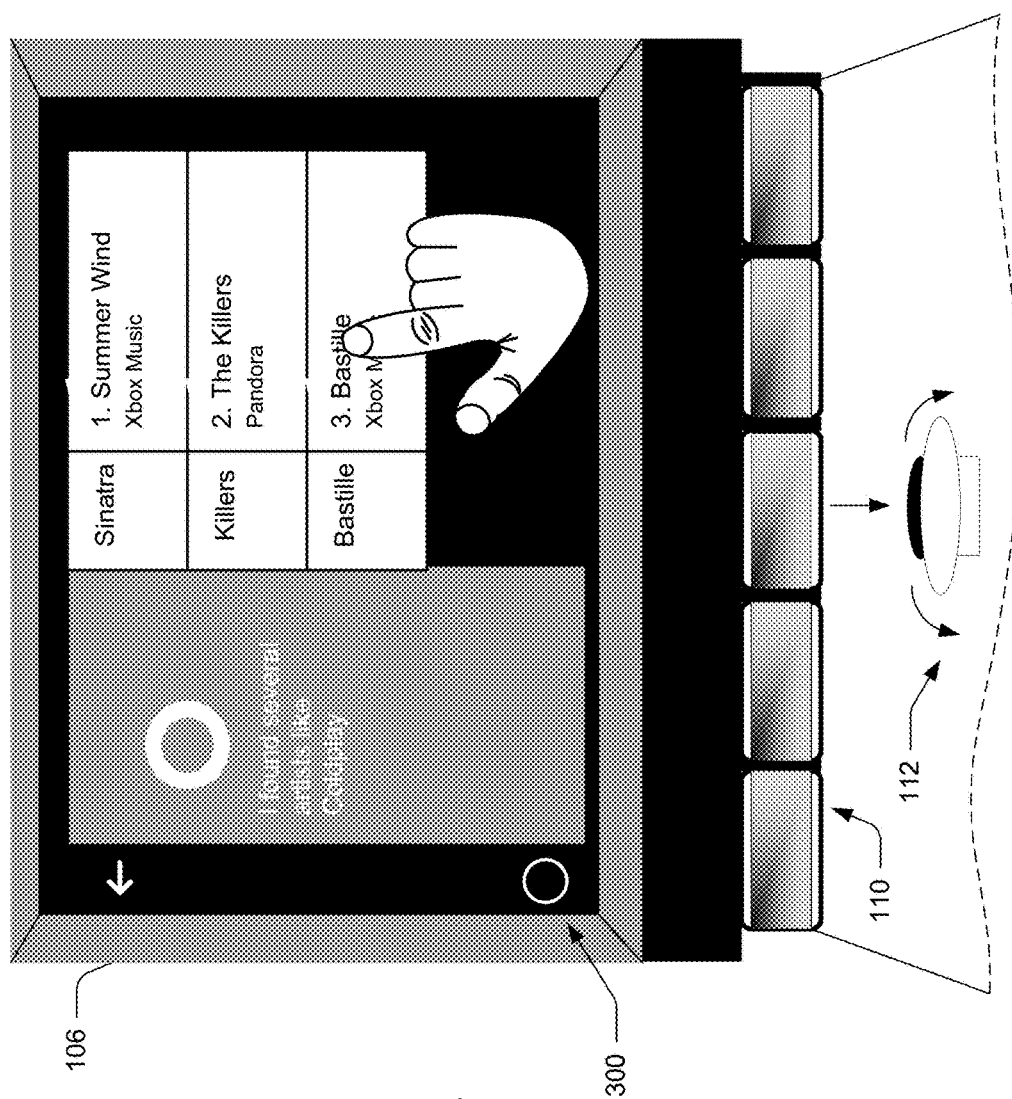
FIG. 8 illustrates a system in accordance with one or more embodiments.

The driver responds "Play some music like Coldplay." The interaction module 210 receives this input and, in cooperation with a media playing application on phone 104, identifies several songs that were returned in an associated query. As an example, consider FIG. 8.

There, three different songs were located and are listed as shown. The user can then use the jog dial to move down through the selections and selected a highlighted song using the jog dial as described above, or make a touch-selection by touching the screen as shown in the illustration. The song will now play on the vehicle's sound system.

Figure 9:
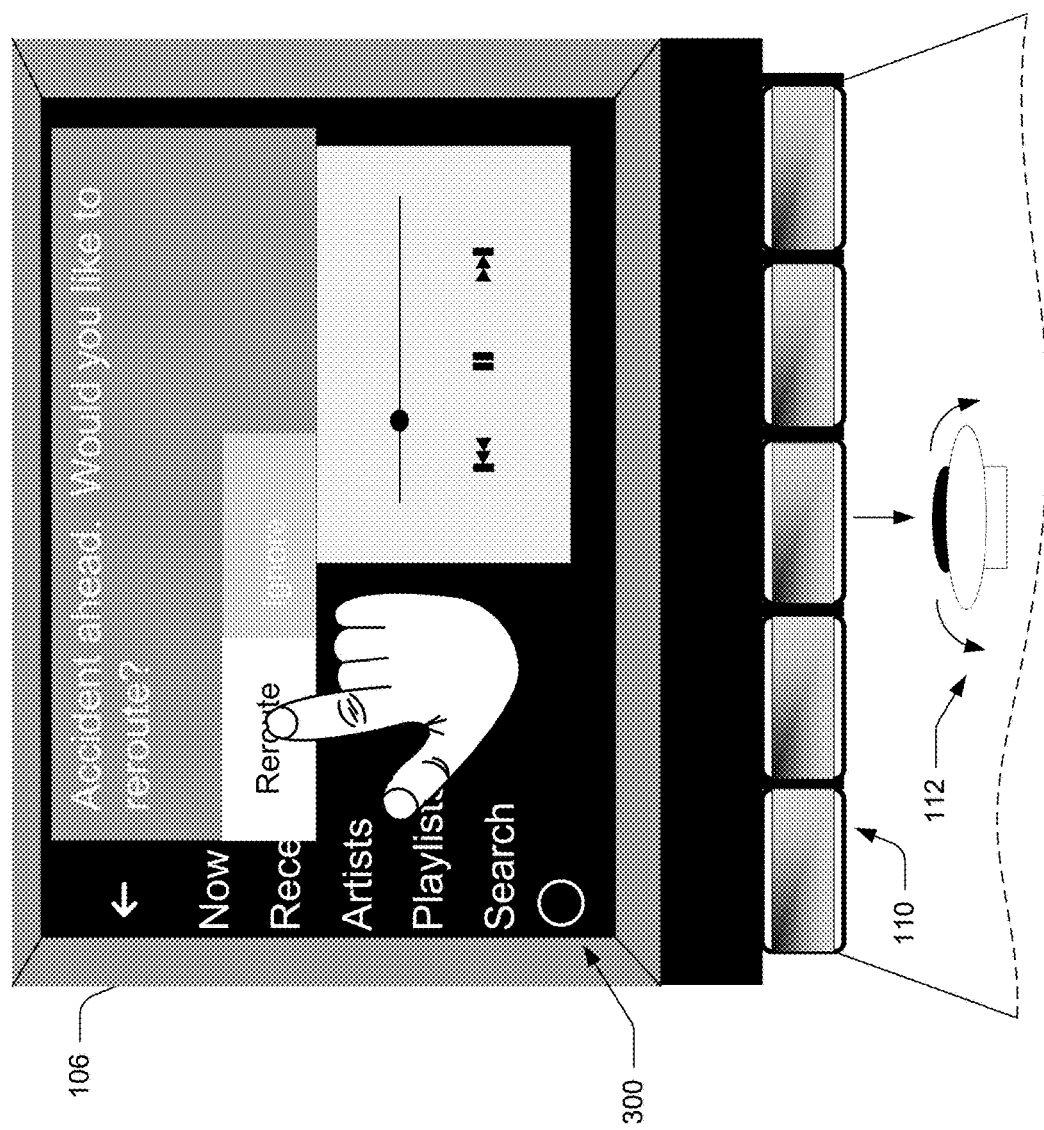
FIG. 9 illustrates a system in accordance with one or more embodiments.

Subsequently, the system learns of an accident along the user's route. The system can do this by way of communication with a cloud service through cloud 204 (FIG. 2). When the system learns of the accident, the system can verbally prompt the user to ascertain whether the user would like to be rerouted. As an example, consider FIG. 9. There, the system verbally prompts the user and provides a user instrumentality that can be selected by the user. In this particular instance, the user has touch-selected the "Reroute" selection so that they can be rerouted around the accident. The user can then receive both audible directions as well as visible directions that are provided on a map displayed on the console's display device. In this manner, actions associated with one particular task can be interrupted when a user's context indicates that performable actions associated with a different task are available for performance.

Assume now that the user wishes to change the music track to which they are listening. They can do so by simply touch selecting the user interface instrumentality 300 and, in a manner similar to that described in FIG. 7, they will be verbally prompted by the system. The user can then provide voice input to "Play next track" and the system will then automatically play the next track.

Accordingly, in this particular example, the user has used three different input modalities to engage their vehicle information/entertainment system by way of their phone.

Figure 10:
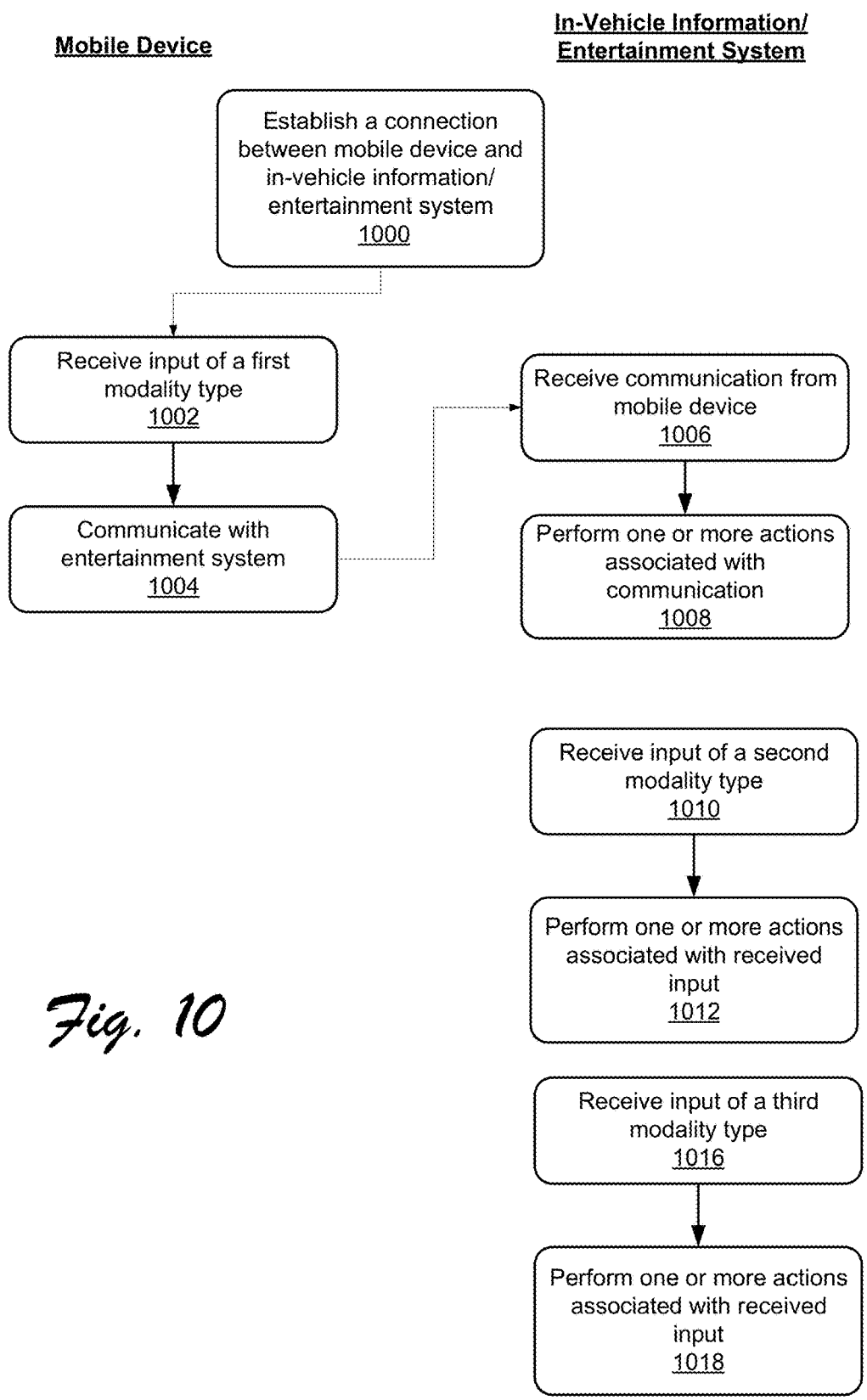
FIG. 10 is a flow diagram that describes steps in a method in accordance with one or more embodiments.

FIG. 10 is a flow diagram that describes steps in a method in accordance with one or more embodiments. The method can be performed in any suitable hardware, software, firmware, or combination thereof. In the flow diagram, there are two columns—one designated "Mobile Device" and the other designated "In-Vehicle Information/Entertainment System". This is to indicate that some of the actions are performed by a mobile device, and other actions are performed by a vehicle's entertainment system.

Step 1000 establishes a connection between a mobile device and an in-vehicle information/entertainment system. Any suitable mobile device can be utilized including, by way of example and not limitation, a mobile phone. In addition, any suitable type of connection can be established between the mobile device and the entertainment system. In addition, aspects of this step can be performed by both the mobile device and the entertainment system. For example, the device and the system can, through a suitable handshake, become operably coupled together. In the example above, a USB connection was utilized to establish communication between the mobile device and the entertainment system.

Step 1002 receives input of a first modality type. The input is associated with a particular task and that a user wishes to accomplish. A particular task may have multiple different actions that are to be performed to accomplish the task. Any suitable modality type can be received including, by way of example and not limitation, voice, touch, and/or input received through control such as a jog dial. In the illustrated examples above, input that initiates the user experience comprises voice input. Responsive to receiving the input of the first modality type, step 1004 communicates with the entertainment system. Any suitable type of communication can be performed. For example, in at least some embodiments, the first input can cause the mobile device and, more particularly, one or more modules executing on the mobile device, to coordinate with one or more applications that reside on the mobile device. The applications can comprise any suitable type of application. For example, as in the example above, if a user wishes to communicate with a particular party, a module executing on the mobile device can ascertain, from the device's contacts application, information associated with the intended callee. This information can then be communicated to the entertainment system along with information and data to enable a user interface to be rendered that can then enable the user to establish the call.

Step 1006 receives the communication from the mobile device. The communication can include information and data to enable a user interface to be rendered on a visual console or display device of the entertainment system. Step 1008 performs one or more actions associated with the communication and performance of the task. Any suitable actions can be performed including, by way of example and not limitation, processing the data and information provided by the mobile device to render a user interface to permit the user to interact with the entertainment system using one or more different modality types.

Step 1010 receives input of a second modality type associated with performing the task. In the illustrated and described example, the second modality type is different from the first modality type. Any suitable modality type can be utilized, examples of which are provided above. Responsive to receiving the input of the second modality type, step 1012 performs one or more actions associated with the received input. Any suitable actions can be performed. In the illustrated and described example, these actions can be associated with a task that was initiated by the actions performed in step 1008. Alternately or additionally, the actions performed by step 1012 can be associated with a task that is different from the task associated with the actions performed in step 1008.

Step 1016 receives input of a third modality type. In the illustrated and described example, the third modality type is different from both the first modality type and the second modality type. Any suitable modality type can be utilized, examples of which are provided above. Responsive to receiving the input of the third modality type, step 1018 performs one or more actions associated with the received input. Any suitable types of actions can be performed. In the illustrated and described example, these actions can be associated with a task that was initiated by the actions that were performed by step 1008 and the actions that were performed by step 1012. Alternately or additionally, these actions can be associated with a task that is different from the tasks associated with the actions performed by steps 1008 and/or 1012. The method can then continue to receive inputs of the first, second, and/or third modality types and perform additional actions associated with the same or different tasks.

In this manner, a user can complete a single task or various tasks using multiple different modalities with smooth continuous modal handoffs between the modalities. The modalities can include voice, touch, and controls such as a jog dial. Smooth modal handoffs permit the user to easily change their input modality depending on their context. So, for example, if a user initiates a task using a voice modality and finds themselves in heavy traffic, they may continue to perform the task using the voice modality until they are less busy driving, e.g., at a stoplight or in light traffic. That is, the user is able to naturally move between these different input modalities in any suitable combination. For example, the user can smoothly move between (1) voice and touch, (2) voice and jog dial, (3) voice, touch, and jog dial or any combination thereof.

Having considered how a task can be completed through multi-modal input, consider now aspects of how voice-only experiences can be tailored based on a user's context.

Tailoring Voice-Only Experiences

In one or more embodiments, voice-only experiences can be tailored based on a user's context. The user's context can include, by way of example and not limitation, the user's drive scenario, cognitive load, and the like. Thus, the voice experience can be dynamically adapted to accommodate the user's context in a manner that promotes driving safety. In addition, through voice interaction the user can be prompted to utilize a particular response type. In this manner, the user is free to choose a response type that is best suited for their current context.

As an example, consider FIG. 11 which illustrates a user driving their car and engaging in a dialogue with their interaction module or personal assistant. In this example, the user has entered the car and connected their mobile device with their vehicle's entertainment system. Accordingly, the mobile device knows that the user is driving.

In this example, the interaction module is represented by the concentric circles icon and the user is represented by the user icon. After starting the car, the user engages the interaction module which, in turn responds "How can I help?" The user responds "What's my day like?" Responsive to this question, the interaction module ascertains, from the user's calendar application, whether the user has any appointments and responds "You have a meeting at 10 with your banker. Hear more?" The user next responds "No thanks."

Sometime later, the user receives a text message and the interaction module notifies the user by saying "You have a text from your brother. Do you want to hear it?" By asking the user if they want to hear the text message, and because the mobile device knows that the user is driving, the interaction module is providing an opportunity for a safer modality than displaying a message on either the mobile device's screen or the console's display device. The user responds "No."

Sometime later the user receives a call and the interaction module notifies the user by saying "Incoming call from your wife. Answer it?" The user responds "Yes" and has a short conversation with his wife. During the course of the conversation, the user learns that his brother has been trying to reach him. The user then engages the interaction module which responds "How can I help?" The user tells the interaction module to "Read the latest message from my brother." The interaction module responds "'Hey Bro—let's have dinner tonight.' Reply, callback, or are you done?" In this particular instance, the interaction module prompts the user as to whether the user wishes to use a particular response type, i.e., a text reply or a telephone call. Accordingly, the interaction module provides the user with an opportunity to select a communication medium that is most convenient given their particular driving context. Responsive to this prompt, the user states "Reply." The interaction module that asks the user "What's your reply?" To which the user responds "Sure. Eight o'clock. I'll make reservations and let you know."

After confirming the content of the reply, the interaction module asks "Send it, add more, or try again?" The user responds "Send it" whereupon the interaction module confirms "Your message was sent."

Sometime later during the course of driving, the user engages the interaction module and the interaction module responds "How can I help?" The user replies "Remind me to make a dinner reservation when I get to work." The interaction module replies "okay. I'll remind you to make a dinner reservation when you get to work. Is that right?" The user responds "Yes." to which the interaction module responds "Great. I added the reminder."

Figure 12:
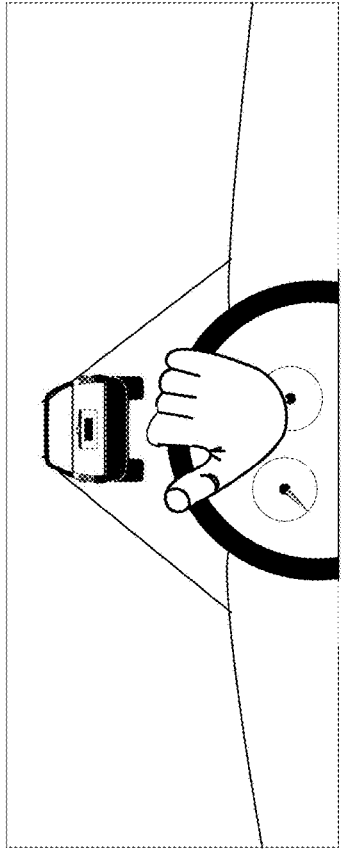
FIG. 12 is a diagram that illustrates a verbal dialog between a user and an in-vehicle system in accordance with one or more embodiments.

As another example, consider FIG. 12 which illustrates a user driving their car and engaging in a dialogue with their interaction module or personal assistant. In this particular example, the user has activated their personal assistant or interaction module. The interaction module responds "How can I help?" The user responds "Play some music like Coldplay." The interaction module responds "Okay. I'll play your Coldplay music on Xbox music."

Sometime later the interaction module interrupts and notifies the user that "There's an accident on your route causing major delays. Would you like to take a detour along SR-123 to save 15 minutes?" The user responds "Yes." The interaction module then responds "Great. I'll walk you through the directions. Take the off ramp labeled 162B in one-mile."

Sometime later the interaction module is again activated and responds "How can I help?" The user asks "When's my next turn?" The interaction module responds "In two miles take a right turn on Mercer Street." Sometime later the interaction module is again activated and responds "How can I help?" The user says "Next track" in order to change to the next song. The interaction module responds "Okay. Next track."

In the example just described, the interaction module offers up proactive assistance to the user. Specifically, by notifying the user that there is an accident on the driving route, the interaction module proactively enables a user to make a decision with respect to their driving route. In addition, the interaction module proactively determines a detour to recommend to the user. This example also illustrates mobile device's contextual awareness of the user's driving situation. That is, by being contextually aware, the interaction module is able to provide intelligent suggestions and prompts to improve the user's experience. Moreover, this example illustrates the system's ability to maintain an understanding of the context of the user's experience so that subsequent input with respect to the user's experience can be accurately acted upon. For example, the user initiates the experience by playing music and is subsequently interrupted by the system with the notification pertaining to an accident. During the user experience associated with receiving rerouting information, the user engages the system to change to the next track. Accordingly, the system maintains an understanding of the context of the user's experience and is able to resume the user's music experience where it left off. As such, the system enables interruption of a first task associated with a first application (e.g., playing music using a media player application) by a second different task associated with a second different application (e.g., being redirected by a map application). The user may engage with the application using multiple different modalities and may seamlessly shift between a current task and a subsequent task and back.

As another example of contextual awareness, consider the following. Assume that the user is traveling down the highway during rush hour. As such, traffic is crowded. By knowing that the user is traveling on a particular highway at a particular time, the interaction module can make decisions regarding how to present the user experience. So, for example, if the user receives a text message, the interaction module can elect to delay the notification to the user until a later time when the user is not driving in rush hour traffic. The same can be said for notifications or prompts of any type. This example also illustrates how the personal assistant experience can be adapted as between mobile and non-mobile scenarios. Specifically, in non-mobile scenarios, notifications can be provided as soon as an event occurs, e.g., receiving a text message. In mobile scenarios, however, such notifications might be modified in terms of the timing.

As another example of contextual awareness, consider the following. Assume that the user is driving in downtown Seattle close to Pike's Place Market and is looking for a parking place. The system knows, by way of the user's calendar, that the user has an appointment at a nearby location. The user also notifies the system that he is trying to find a parking place. The system suggests "It's probably best for you to park now because if you park, you're going to find better parking and it's only a five minute walk instead of staying in traffic for 15 minutes trying to find another spot."

As another example, consider that the user is running low on gas and is in traffic. The user may be subscribed to "Shell" service station service. By knowing the current location and that the vehicle's gas is low, as well as the "Shell" service station subscription, the interaction module might suggest "You should get gas as soon as possible. There is a Shell station at the next exit." In this manner, the interaction module is able to work in cooperation with other applications executing on the user's mobile phone and/or applications executing remotely, e.g., in the "cloud", and make contextually-appropriate suggestions based on information gleaned from these other applications.

As another example, the system may note that the user enjoys alternative music. When the user drives through Southern California, the system might notify the user that "Hey, you're into alternative music and driving through Southern California. There are some great local bands you may want to learn about. Would you like to hear about them?"

Figure 13:
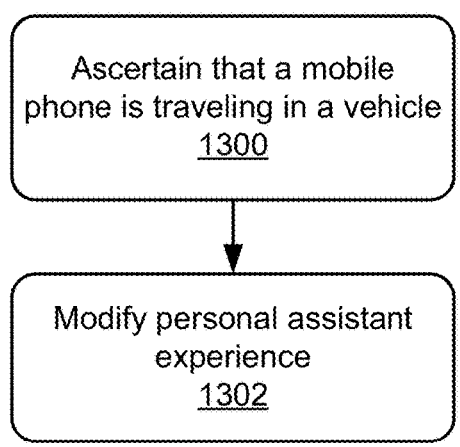
FIG. 13 is a flow diagram that describes steps in a method in accordance with one or more embodiments.

FIG. 13 is a flow diagram that describes steps in a method in accordance with one or more embodiments. The method can be performed in any suitable hardware, software, firmware, or combination thereof. In the illustrated and described embodiment, the method is performed by a suitably-configured mobile device such as a mobile phone.

Step 1300 ascertains that a mobile phone is traveling in a vehicle. The step can be performed in any suitable way. For example, in at least some embodiments the step can be performed when an operative connection is established between the mobile phone and the vehicle's entertainment system. Responsive to ascertaining that the mobile phone is traveling in a vehicle, step 1302 modifies a personal assistant experience associated with the mobile phone. This can be done in any suitable way. For example, this step can be performed by using a voice modality for notifications rather than other modalities such as the phone's display screen. For example, in non-mobile scenarios, notifications may be provided by simply displaying a notification on the phone's display screen, or perhaps by using a badge or icon. In mobile scenarios, however, voice notifications might be used in place of or in addition to displaying notifications in order to promote driving safety. In this manner, the user need not look at the phone screen in order to receive the notification. This step can also be performed by suggesting response types that lend themselves more safely to the driving scenario. For example, responsive to receiving a text message and notifying the user, the personal assistant might suggest response types that do not require the user to look away from the road, e.g., text reply, telephone call, voice over IP call, and the like. Further, the step can be performed by adjusting the timing of notifications. Specifically, as in the example above, if a user is in rush hour traffic, a notification might be delayed until such time when the user is not in the rush-hour traffic.

Figure 14:
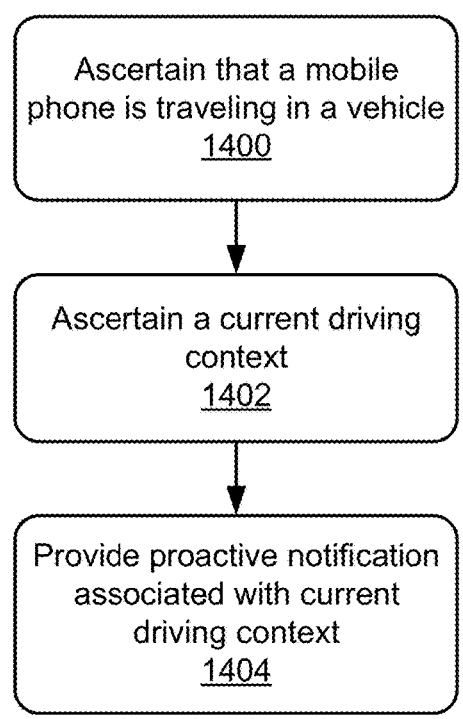
FIG. 14 is a flow diagram that describes steps in a method in accordance with one or more embodiments.

FIG. 14 is a flow diagram that describes steps in a method in accordance with one or more embodiments. The method can be performed in any suitable hardware, software, firmware, or combination thereof. In the illustrated and described embodiment, the method is performed by a suitably-configured mobile device such as a mobile phone.

Step 1400 ascertains that a mobile phone is traveling in a vehicle. Examples of how this can be done are provided above. Step 1402 ascertains a current driving context. This step can be performed in any suitable way. For example, in at least some embodiments the mobile phone can ascertain a current driving context (e.g., current location, traffic conditions, weather conditions, road construction, and the like) based on communication with a remote source such as a web service. Responsive to ascertaining the current driving context, step 1404 provides proactive notification associated with the current driving context. So, for example, based on a current location and traffic conditions, the phone device's personal assistant may recommend alternate routes. Alternately or additionally, based on current weather conditions, the personal assistant may issue weather-related warnings, e.g., "There is a tornado warning for your current location. Please consider finding a safe place, such as an overpass, to pull off the road."

Having considered various embodiments associated with tailoring the voice-only experience, consider now a discussion of how the user interface can be tailored for jog dial and touchscreen.

Tailoring the User Interface for Jog Dial and Touchscreen

One of the considerations that is taken into account when designing input mechanisms for both the jog dial and touchscreen is that, because of its haptic nature, the jog dial is typically more difficult to design for. At the same time, if touch input is to be considered in addition to jog dial input, the input target should be designed to accommodate both. That is, it should be designed to facilitate ease of touch for touch input, as well as ease of navigation for jog dial input. In the illustrated and described embodiment, targets include objects that can be tabbed through for jog dial input, and sized to accommodate touch input. Any suitable type of objects can be utilized, examples of which include tiles or icons.

Figure 15:
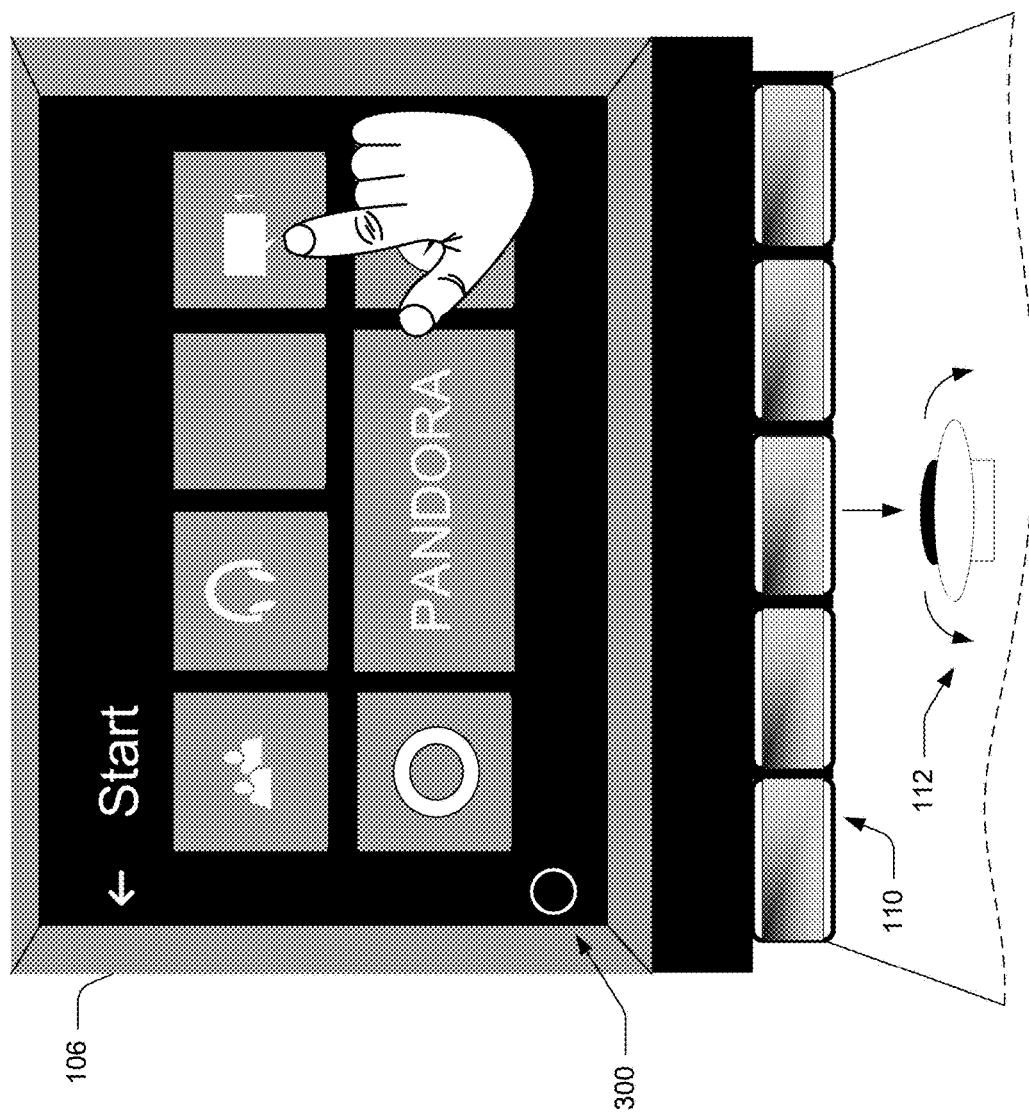
FIG. 15 illustrates a system in accordance with one or more embodiments.

As an example, consider FIG. 15 which illustrates the console 106 from FIG. 3 with like numerals being used to depict like components. There, individual tiles are shown being displayed by the console 106. The tiles are sized to be easily touch-selected by a user. At the same time, navigation through the tiles can be facilitated with the jog dial 112 in a tabbed-through manner. Specifically, navigation can begin with a tile at the upper left and, by rotating the jog dial in the clockwise direction, the next rightmost tile in line can be navigated to. This can continue until the end of the first row is reached (i.e. the rightmost tab in the first row), whereupon continued rotation of the jog dial in the clockwise direction will navigate to the leftmost tile in the second row, and so on. By using a single linear direction for navigation with the jog dial, the user is more easily able to control navigation in a predictable fashion. This is because progression through the navigational targets takes place in a serial, ordered, and predictable way. In this particular example, navigation of the objects occurs in a left-to-right, top-to-bottom manner.

In addition, as described above in the section addressing multi-modal input, input to complete a particular task can be switched between jog dial and touch in a predictable, seamless fashion. For example, assume that a user has touch-selected a map to facilitate their navigation. They wish to zoom in on the map to get a more granular visual of their current location. While a user interface instrumentality on the map can permit the user to execute multiple touch inputs to zoom the map, as an alternative the jog dial can be used. This alleviates the user from having to remove their eyes from the road each time they selected a touch-zoom. Specifically, once the map has been selected, the user can simply turn the jog dial clockwise to zoom in, or counter-clockwise to zoom out. In this manner the user does not have to avert their eyes from the road in order to zoom the map.

In at least some embodiments, once zoomable content such as a map or other affordance is presented on the console display, zoom input can be locked to the jog dial to ensure that, in the event the user wishes to execute a zoom operation, they do so using the safest modality, i.e., one which does not require them to avert their eyes from the road. In this manner, one of the input modalities can be locked out in favor of the other, based upon the context of the user's interaction with the displayed content, e.g., the objects displayed on the console.

Alternately or additionally, the user may have selected zoomable content using the jog dial, as by pressing down on the jog dial in the presence of displayed content. Once the zoomable content is displayed, the content can be zoomed using touch input such as, a two finger pinch gesture.

In other embodiments, once zoomable content is displayed, the jog dial can be utilized to toggle across the displayed controls to select the zoom modality, press on it, and then perhaps have a slider control displayed that can be adjusted by touch or the jog dial.

Methods in accordance with the embodiment described just above, can be performed in a manner similar to that described in connection with FIG. 10. That is, input can be received by way of modalities other than the jog dial in order to initiate a task or perform actions within a task. The user can then switch to the jog dial to provide input as appropriate. For example, in some instances, input may be locked such that at some particular points during performance of the task, input can only be provided by way of the jog dial. Alternately or additionally, the jog dial can be utilized in performance of the task to navigate various controls whereupon input by way of other input modalities can be utilized to further perform actions within the task.

Figure 15A:
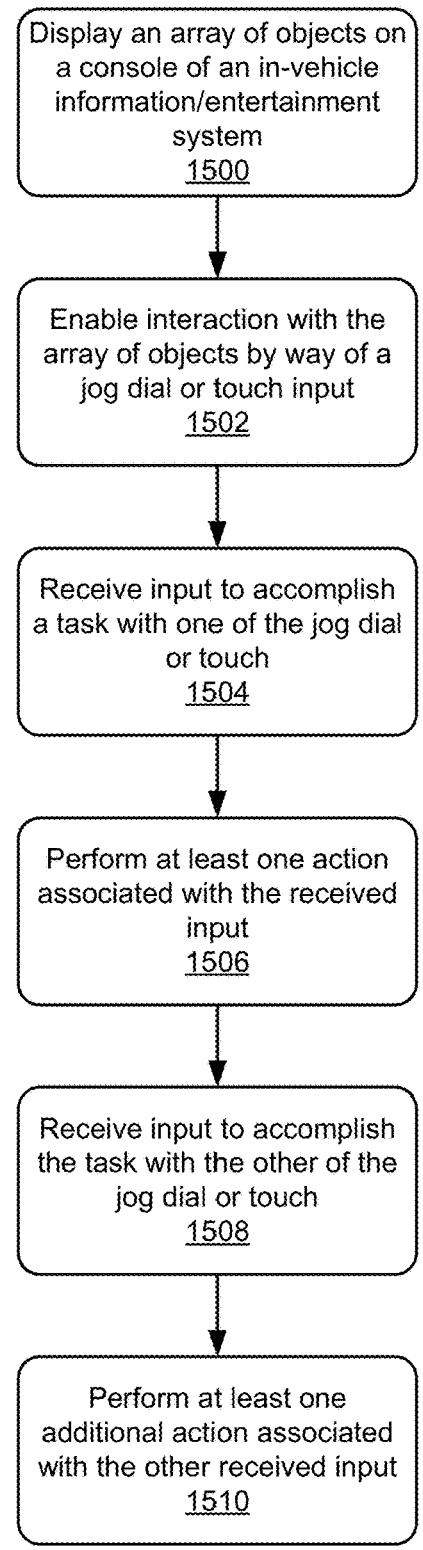
FIG. 15A is a flow diagram that describes steps in a method in accordance with one or more embodiments.

FIG. 15A is in is a flow diagram that describes steps in a method in accordance with one or more embodiments. The method can be performed in any suitable hardware, software, firmware, or combination thereof. In the illustrated and described embodiment, the method is performed by a system that includes a suitably-configured mobile device such as a mobile phone, and an in-vehicle information/entertainment system.

Step 1500 displays an array of objects on a console of an in-vehicle information/entertainment system. The step can be performed in any suitable way using any suitable type of objects. For example, the console's display can be driven by content and applications that reside on the mobile phone.

The objects that can be displayed can comprise any suitable types of objects examples of which include tiles, icons, and the like. In the FIG. 15 example, the array of objects comprises a collection of tiles that are displayed in rows and columns. Step 1502 enables interaction with the array of objects by way of a jog dial or touch input. In this manner, a user is free to engage the array of objects using either modality. Step 1504 receives input to accomplish a task with one of the jog dial or touch. Any suitable type of task can be accomplished. In the examples above, tasks can include navigating through the array of objects to eventually make a selection. Step 1506 performs at least one action associated with the received input. Using the navigation example, such action can include visually navigating through the objects to enable the user to make a selection. Step 1508 receives input to accomplish the task with the other of the jog dial or touch. In this manner, the user can seamlessly switch modalities in order to accomplish the same task. For example, if the first received input was by way of the jog dial, a navigation would be performed to navigate through the individual objects of the array. Upon reaching an object of interest, the user may then touch the object to select it. Step 1510 performs at least one additional action associated with the other received input. This can include, for example, launching content associated with a selected object.

In yet other embodiments, the user interface displayed on the console can be adapted to facilitate navigation and content consumption using the jog dial and the touch screen.

Figure 16:
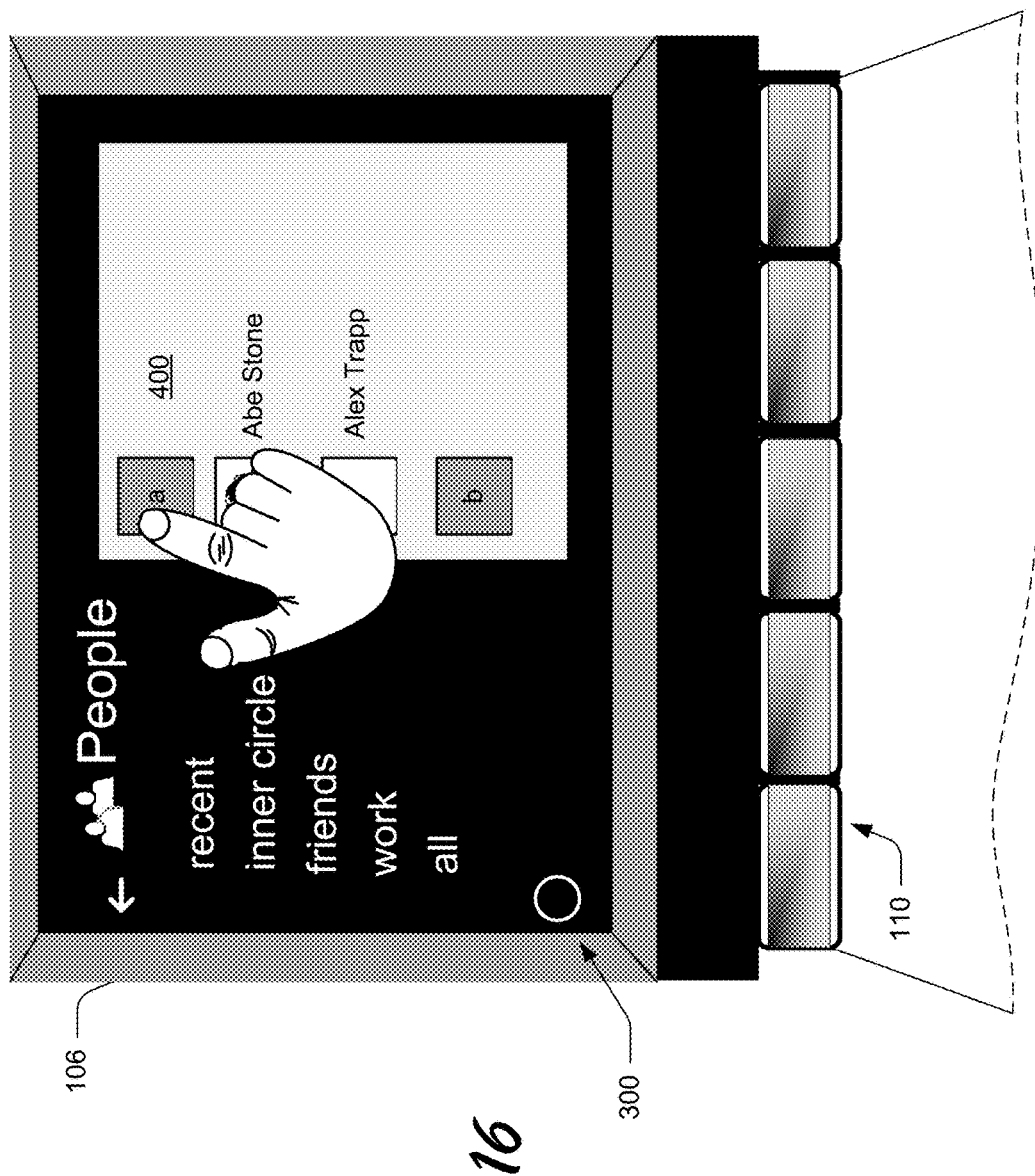
FIG. 16 illustrates a system in accordance with one or more embodiments.

One such adaptation can be utilized in connection with lists that may be long in length. As an example, consider FIG. 16 which displays a portion of a user's contact list. The contact list has many entries and if a user wishes to call a particular contact while driving, they are faced with a problem of navigating the many entries of the contact list to find the particular contact of interest. In this example, assume that the jog dial is unavailable for use. In this case, the list is configured to include an affordance that enables the user to jump by letter.

In this particular example, the jump-by-letter feature is accessed by selecting a particular letter as shown in the figure. There, the user has touch-selected the letter "a".

Figure 17:
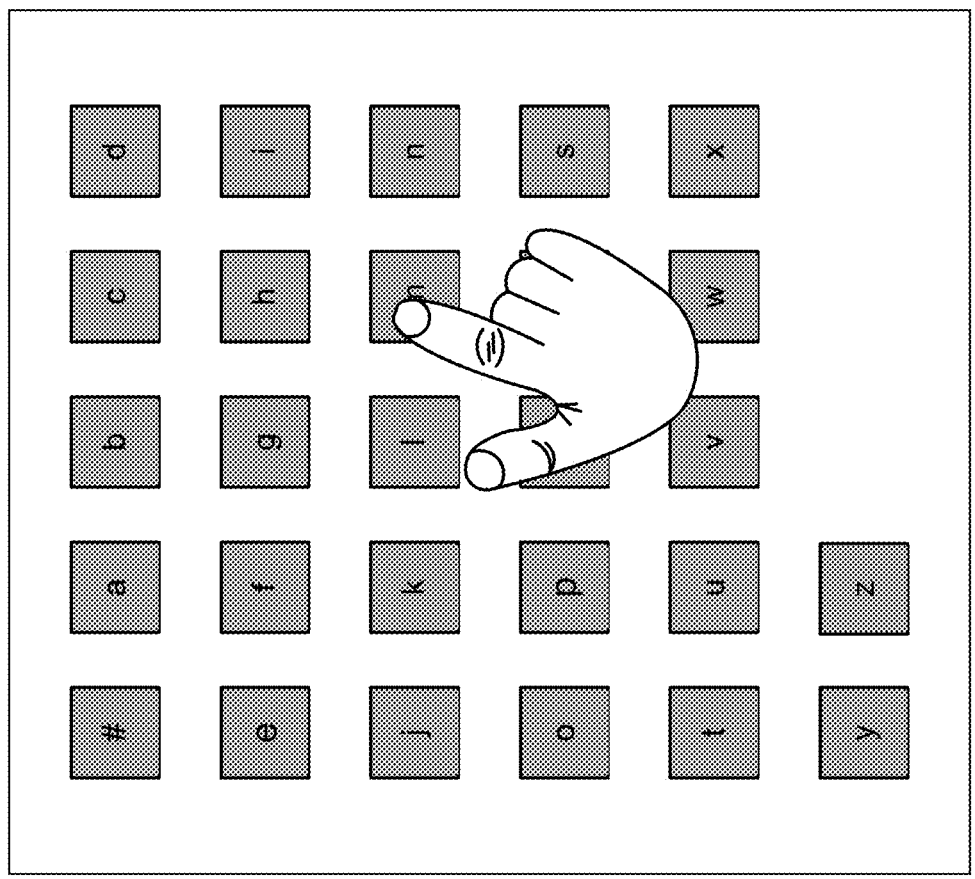
FIG. 17 illustrates aspects of a system in accordance with one or more embodiments.
Figure 18:
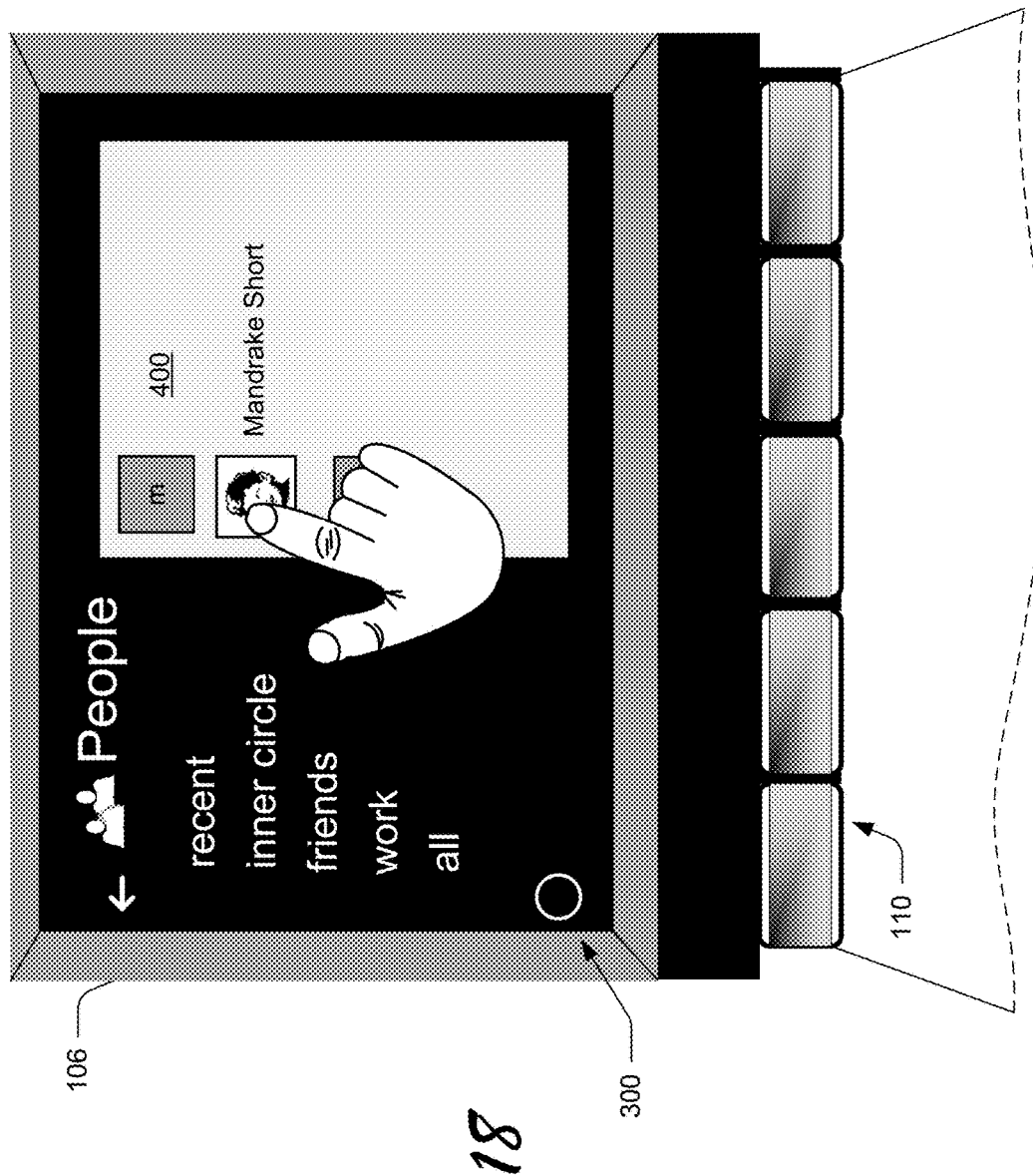
FIG. 18 illustrates a system in accordance with one or more embodiments.
Figure 19:
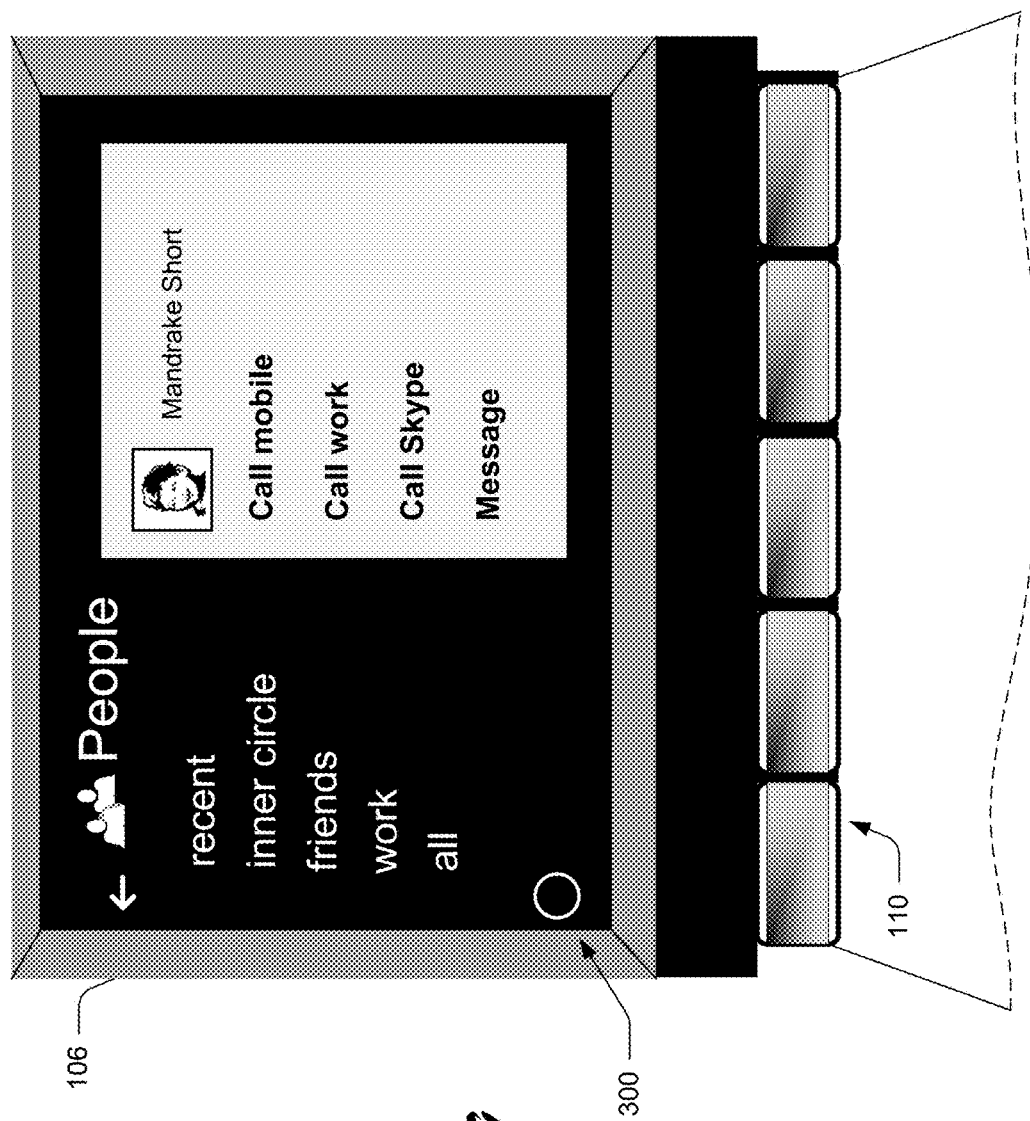
FIG. 19 illustrates a system in accordance with one or more embodiments.

Responsive to touch-selecting a particular letter while the contacts are displayed, a grid of selectable letters is provided to enable the user to jump to a particular letter. As an example, consider FIG. 17 where, because of spacing constraints, the letter grid is shown separate from the console. In this example, the user has touch selected the letter "m". Responsive to touch-selecting the letter "m", navigation to the contacts starting with the letter "m" occurs, such as that shown in FIG. 18. There, the user can select a particular contact—here, "Mandrake Short" with whom to communicate. Once the contact is selected, the user can be presented with several communication options, such as those shown in FIG. 19.

Figure 19A:
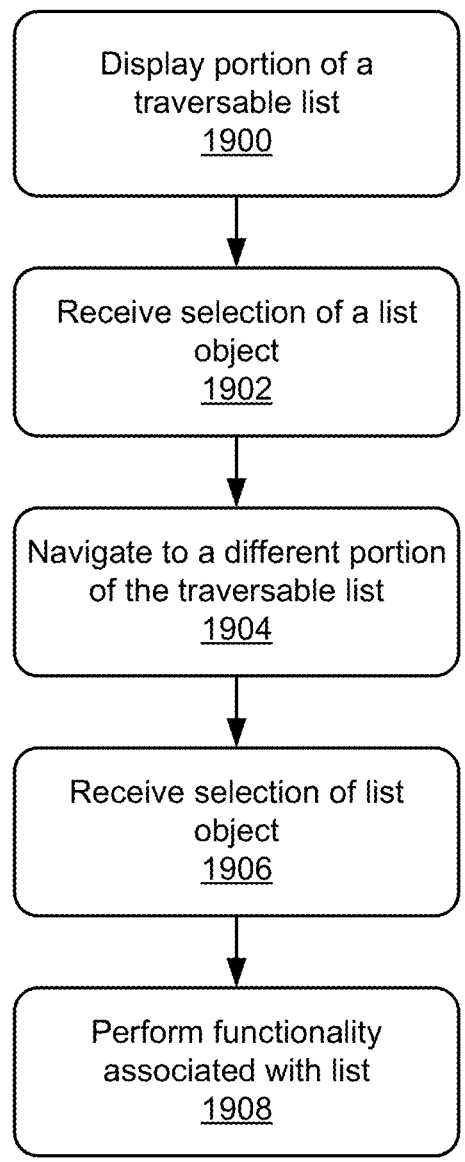
FIG. 19A is a flow diagram that describes steps in a method in accordance with one or more embodiments.

FIG. 19A is a flow diagram that describes steps in a method in accordance with one or more embodiments. The method can be performed in any suitable hardware, software, firmware, or combination thereof. In the illustrated and described embodiment, the method is performed by a suitably-configured mobile device such as a mobile phone and in-vehicle entertainment/information system.

Step 1900 displays a portion of a traversable list. The traversable list can include content from the mobile phone. Specifically, this particular example, the mobile phone is operably coupled to the in-vehicle entertainment/information system as described above. In this manner, the mobile phone's content can be displayed on the vehicle's console.

Any suitable type of traversable list can be provided, an example of which is a user's contact list as described above.

Step 1902 receives selection of a list object. Any suitable type of list object can be the subject of the received selection. For example, in the contact list example above, the selection was received with respect to a particularly-displayed letter. In at least some embodiments, the traversable list can include list objects that enable navigation to other locations within the list, and list objects that include content of the list. In the contact list example, list objects that enable navigation to other locations include displayed letters, while objects that include content of the list include individual contacts of the user. Responsive to receiving selection of the list object, step 1904 navigates or enables navigation to a different portion of the traversable list. This step can be performed in any suitable way. For example, in at least some embodiments, the step can be performed by displaying an array or grid of objects that enable navigation to different portions of the traversable list. In the context example above, the array or grid of objects that enable navigation two different portions of the list include individual letters that may be selected. Responsive to receiving selection of one of the displayed objects of the array or grid, step 1904 completes its navigation to a portion of the list corresponding to the selected letter. Step 1906 receives selection of a list object. This step can be performed by receiving selection of a list object that includes content of the list. For example, in the contact list example, this step can be performed by receiving selection of an individual contact that appears within the list. Responsive to receiving selection of the list object, step 1908 performs functionality associated with the list. Any suitable type of functionality can be performed. In the contact list example above, such functionality can include presenting several different communication options that can be selected by a user for communicating with a selected contact.

Assume now that the jog dial is available and the tiles with letters used for the jump-by-letter feature, as in the previous example, is turned off to allow for a more fluid experience. In this case, the affordance to jump by letter appears as a large single letter replacing the list when the user spins the jog dial quickly.

Figure 21:
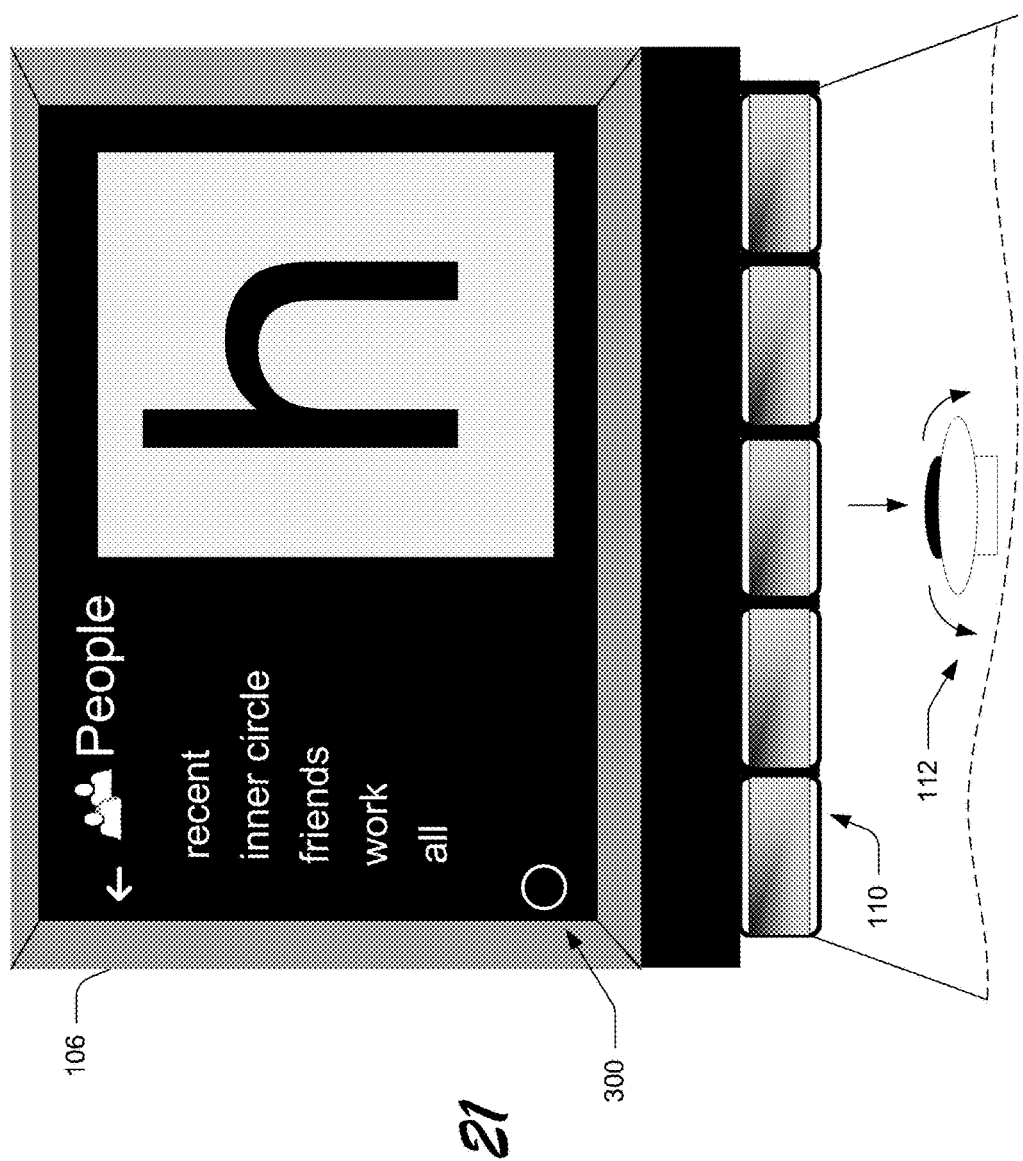
FIG. 21 illustrates a system in accordance with one or more embodiments.
Figure 22:
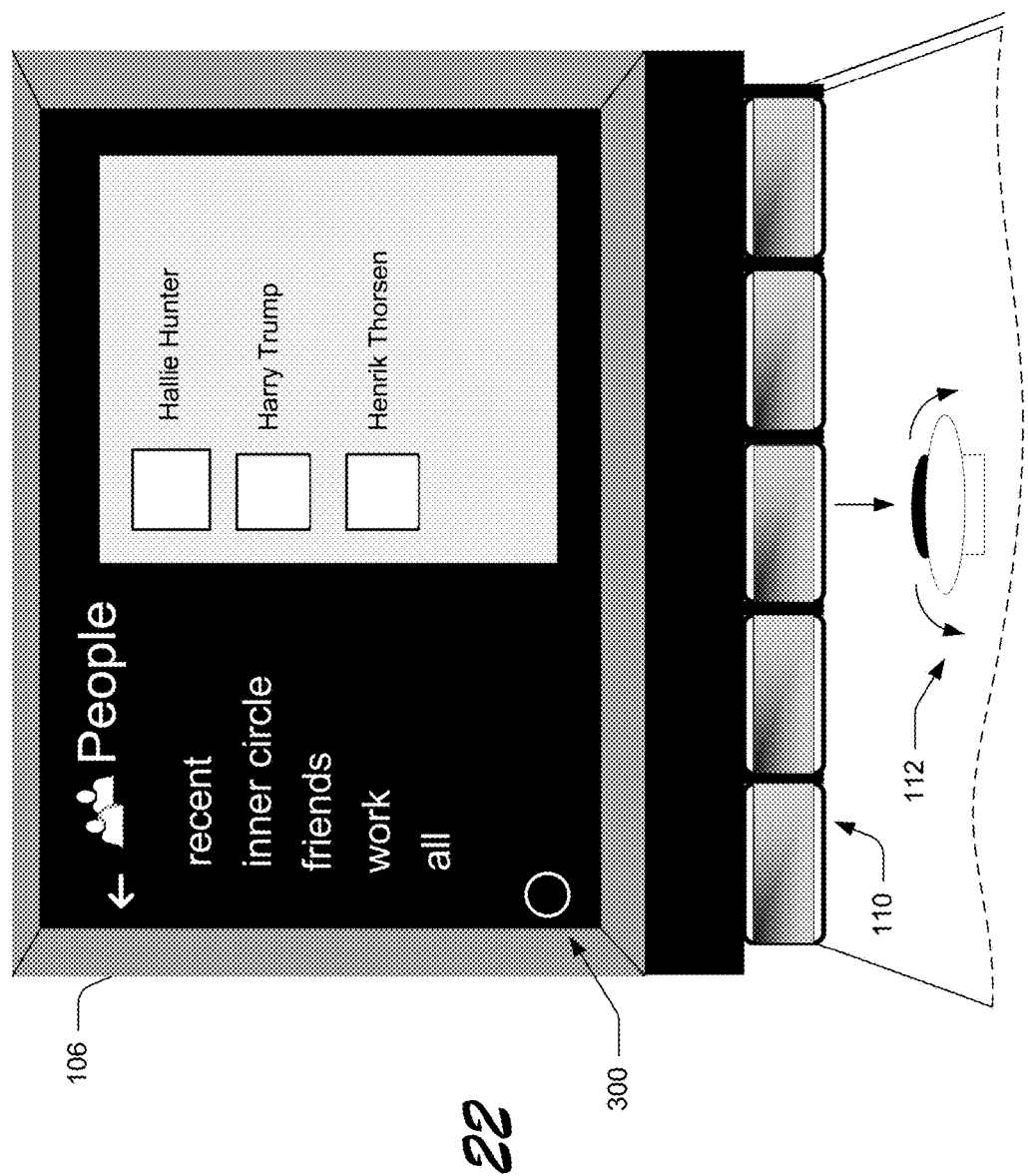
FIG. 22 illustrates a system in accordance with one or more embodiments.

As an example, consider FIG. 20. There, a large letter "e" is displayed. By spinning the jog dial quickly, the letters can be quickly navigated to arrive at a desired letter such as, for example, the letter "h" as shown in FIG. 21. Now, by pressing the jog dial, the user is returned to the place in the list corresponding to the selected letter such as shown in FIG. 22.

In a similar manner, once the user arrives at the desired letter in the list, they can navigate quickly through the entries in the list in much the same way they did while navigating to the individual letters. That is, when the user spins the jog dial quickly, an assumption is made that the user wishes to move far down the entries in the list and, thus, the user is able to jump down the list and traverse over many entries. Alternately, by slowly turning the jog dial, the user can serially progress downward through each displayed name. So, in this example, the jog dial may start by selecting the first name in the list and by slowly turning the jog dial the user can progress down serially through each displayed name. Now, assume the user spins the jog dial quickly. In this manner, the list can be traversed quickly and multiple list entries can be skipped over to arrive at an entry that appears several entries down in the list.

Figure 22A:
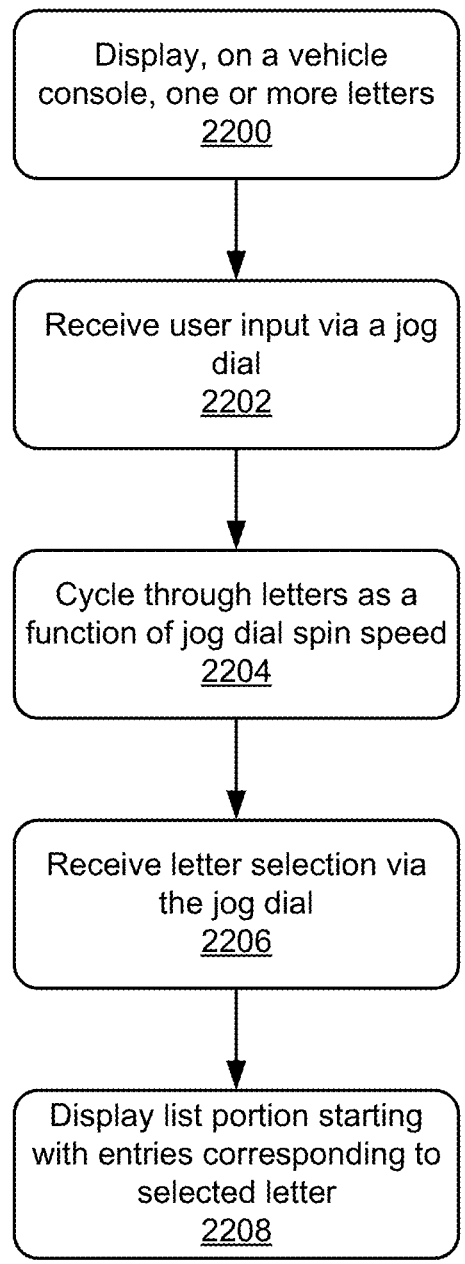
FIG. 22A is a flow diagram that describes steps in a method in accordance with one or more embodiments.

FIG. 22A is a flow diagram that describes steps in a method in accordance with one or more embodiments. The method can be performed in any suitable hardware, software, firmware, or combination thereof. In the illustrated and described embodiment, the method is performed by a suitably-configured mobile device such as a mobile phone and in-vehicle entertainment/information system.

Step 2200 displays, on a vehicle console, one or more letters. This step can be performed in any suitable way. For example, in at least some embodiments, a single letter can be displayed. Alternately or additionally, in at least some embodiments, multiple letters can be displayed such as a series of three or four letters. Step 2202 receives user input via a jog dial. This input can be received as a result of the user spinning the jog dial in a particular direction, e.g., clockwise or counterclockwise. Step 2204 cycles through letters as a function of the jog dial spin speed. In the illustrated and described example, cycling through the letters can include displaying, for a brief instant, individual letters in a serial fashion until arriving at a destination letter. Step 2206 receives a letter selection via the jog dial. This step can be performed, for example, by receiving user input that depresses the jog dial or otherwise engages the jog dial in a manner indicating a desire to select a letter. Responsive to receiving the letter selection, step 2208 displays a list portion starting with entries corresponding to the selected letter. For example, as in the FIG. 22 example, entries starting with the selected letter "H" can be displayed. Following this, the jog dial may be used to navigate the list portion, forwards and backwards, to arrive at a desired entry. Once the desired entry is selected, functionality including communication-five functionality can be exposed to the user to enable them to communicate with a selected entry.

Adaptive User Interface

Because of the very nature of the differences between a mobile device and a console's display device, the user interface experience as between the two can be different. This can be for number of reasons not the least of which is safety. Similarly, if a user is engaged with their mobile device outside the context of the vehicle, one assumes that the user's full attention is being paid to their user interface experience with the mobile device. On the other hand, when the user is in their car using their mobile device to interface with the vehicle's console, less than the user's full attention is being paid to the user interface experience with the console.

With this in mind, various embodiments make adaptations to the user interface experience of the mobile device in order to present content from the mobile device on the console's display device in a manner which enables the user to clearly see the content and promotes safety.

Figure 23:
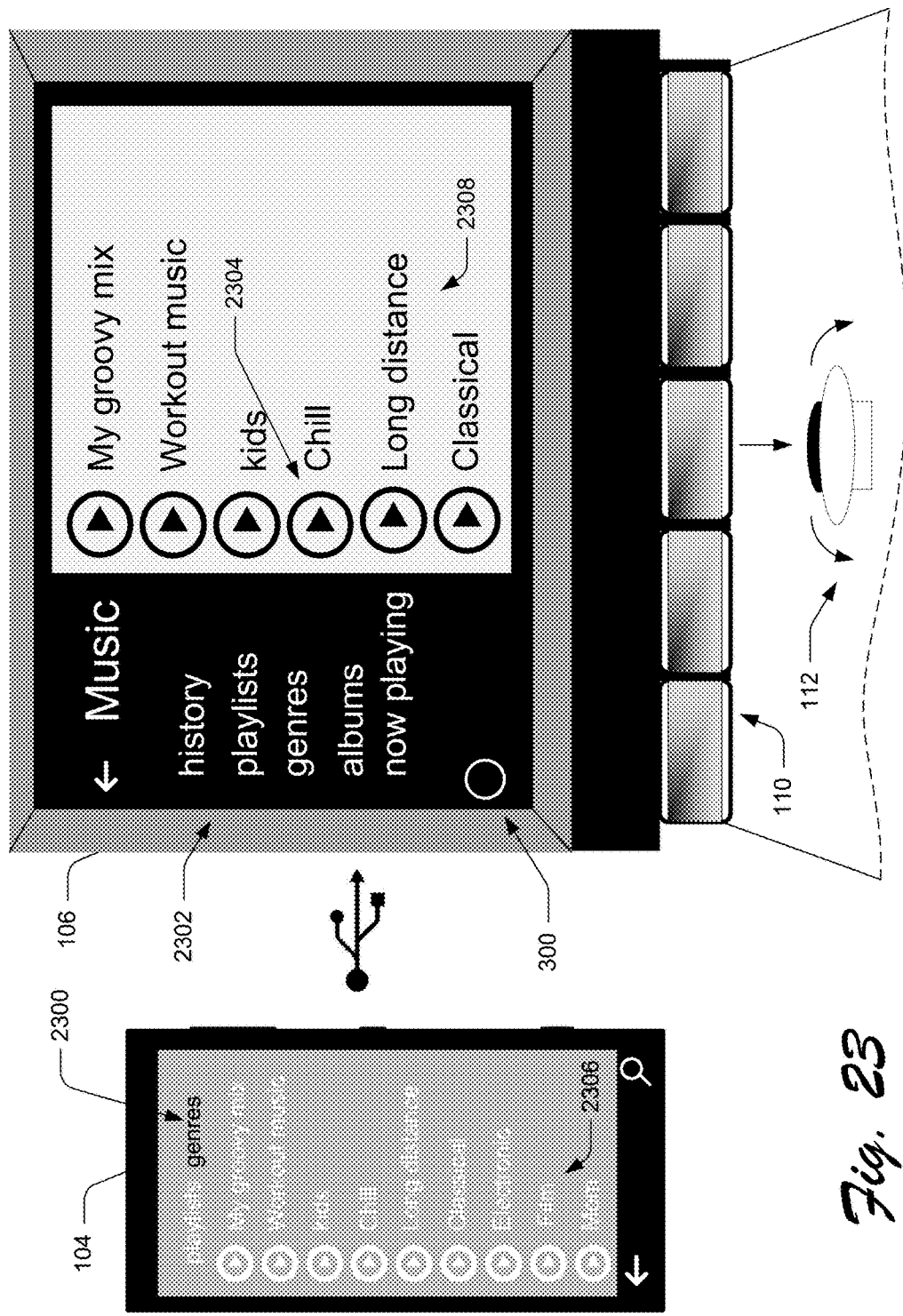
FIG. 23 illustrates a system in accordance with one or more embodiments.

As an example, consider FIG. 23 which shows a side-by-side comparison of the user interface experience of a mobile device versus the user interface experience of the console's display device.

Consider first the pivot control on the mobile device, shown generally at 2300. There, the pivot control resides in the form of a horizontally scrollable list of pivot items, e.g., "playlists", "genres", and the like. When the user engages their mobile device outside the context of the vehicle, they can simply scroll through the various pivot items to bring them onto the display.

Consider now an adaptation of the pivot control for use in connection with the vehicle's console shown generally at 2302. When content of the mobile device is projected onto the console's display device, the pivot control can be adapted to present content in a fashion more suitable for an environment in which the user is able to provide less than all their attention to the user interface experience. Specifically, a first of the adaptations is that the pivot control is presented as a vertical list of tabs that are laid out with all views visible in one glance. This is different from the pivot control in the mobile device because in this particular instance, the user does not have to provide input by way of any input modality in order to see all of the pivot items. The pivot items are also presented with a larger text size than that utilized in the mobile device. This promotes at-a-glance consumption by the user. In addition, larger touch targets are presented such as that shown at 2304.

Consider now the list control on the mobile device shown generally at 2306. In this instance, the list control displays a sufficient number of list items to fill the mobile device's display. In this particular instance, depending on the size of the text, this could include displaying eight, nine, or 10 or more items. When the user engages their mobile device outside the context of a vehicle, there really is no concern for the user's safety vis-à-vis the number of list items displayed. This is because an assumption is made that the user is providing their full attention to the user interface experience on their mobile device. In addition, on the mobile device, the list control is scrollable, as by being vertically scrollable to access items that are not displayed that appear further down the list. On the other hand, when content of the mobile device is projected onto the console's display device, list control adaptations are made.

For example, consider the list control 2308. Various embodiments display a predefined number of list items that is less than the number of list items that are displayed on the mobile device. So, for example, if the mobile device displays 10 items, the console's display device may display only six items in order to promote glanceability and easy consumption. In addition, in at least some embodiments, the list control displayed on the console is not continuously scrollable, but rather uses a paging model in order for the user to page through multiple list items at a time. Further, other adaptations can include utilizing larger text sizes and larger target sizes for items appearing in the console's list. Also, visible focus is provided for jog dial input. As an example, the "playlist" item can be highlighted such that the user can easily visually ascertain the location in the pivot control and can provide jog dial input to move up and down items in the pivot control.

Figure 24:
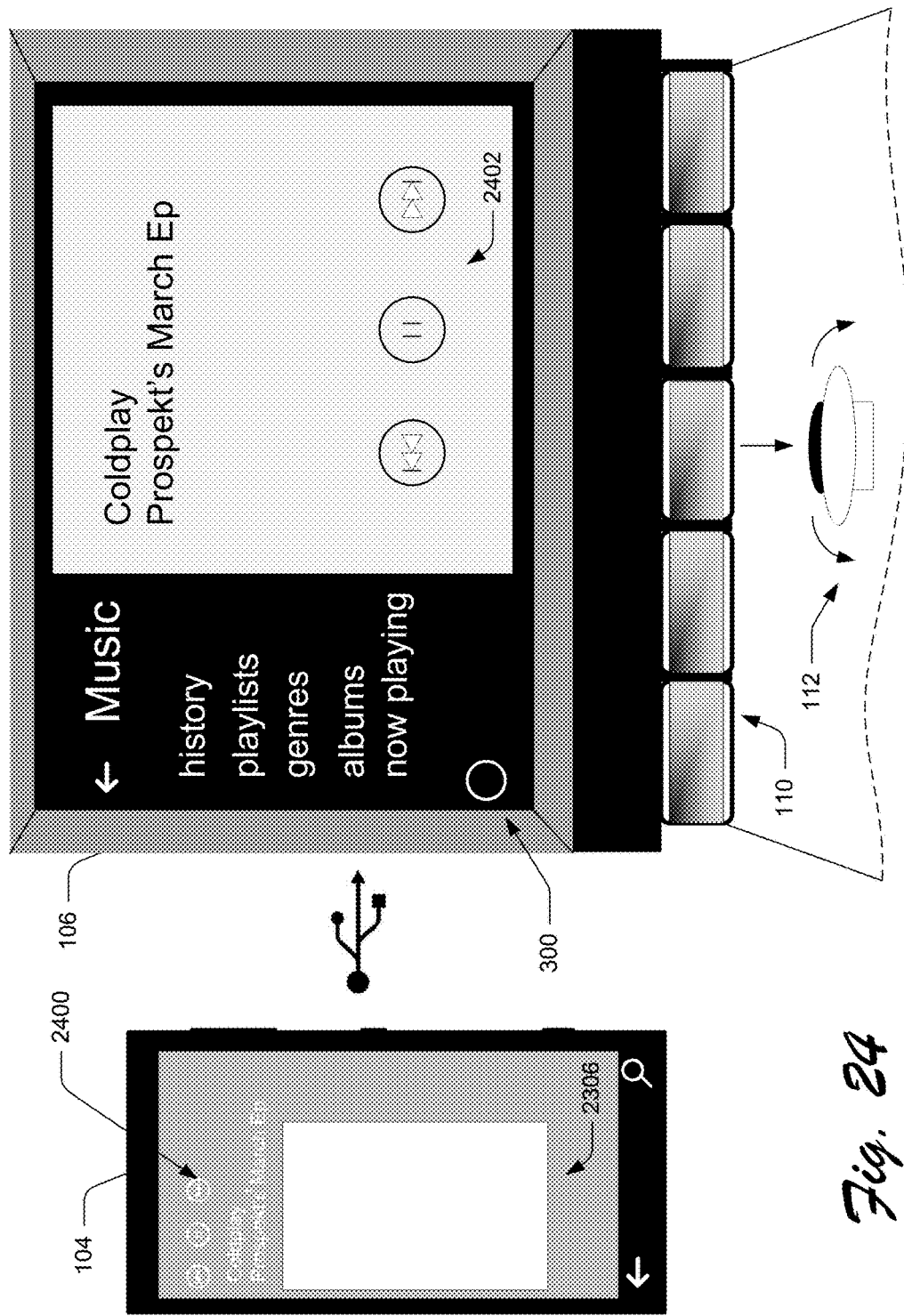
FIG. 24 illustrates a system in accordance with one or more embodiments.

Other adaptations can be made with respect to other user interface experiences. As an example, consider FIG. 24 which illustrates a media element control 2400 on the mobile device, and a media element control 2402 on the console's display device. Whereas on the mobile device, the media element control can enable the user to play both audio and video content. The media element control on the console can be configured to enable only audio to be played and not video content. Further, larger touch targets such as play and pause buttons and visible focus for the jog dial input are provided. Again, such adaptations promote ease of consumption and safety.

Other adaptations can be made with respect to other user interface experiences. For example, in the mobile device, a panorama control can be provided on the phone to enable user to pan through content or items. In at least some embodiments, any such time where the user interface experience on the mobile device would enable a panorama control, the panorama control is disallowed on the console and instead, is replaced with a pivot control. One reason for replacing the panorama control with a pivot control is that panorama controls tend to rely heavily on the use of swipe gestures and animation. By replacing the panorama control with a pivot control, the user can devote less attention to content that appears in the pivot control in order to make selections or navigations.

Other adaptations can be made with respect to so-called grid controls. Specific, some applications on mobile devices utilize a grid in order to present content. An example of a grid is shown in FIG. 3. Grid controls tend to work well in the context of mobile devices, when the user can devote their attention to the navigation experience. Grid control navigation experiences can tend to be somewhat free, unpredictable, and dynamic. For example, a user can typically, through various types of swipe gestures, traverse through a grid in a seemingly unpredictable way in order to access the grid's content. In the context of a vehicle's console, the grid control user experience of the mobile device can be replaced with a list type experience such as that shown in FIG. 23. The list experience, in the context of the console's display device, can promote a more predictable and consistent traversal experience, particularly with respect to jog dial input.

Figure 25:
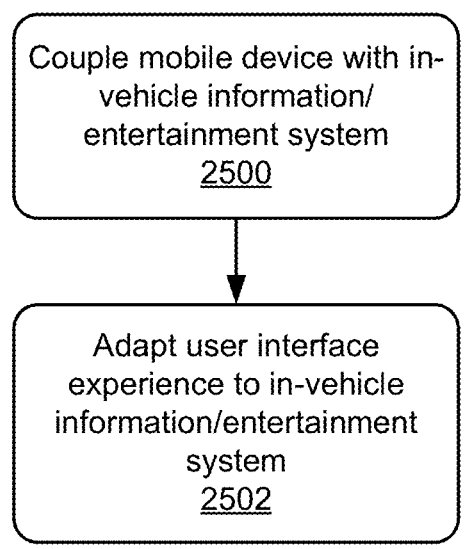
FIG. 25 is a flow diagram that describes steps in a method in accordance with one or more embodiments.

FIG. 25 is a flow diagram that describes steps in a method in accordance with one or more embodiments. The steps can be implemented in connection with any suitable hardware, software, firmware, or combination thereof. In at least some embodiments, the method can be implemented by a suitably configured system such as a mobile device and an in-vehicle information/entertainment system.

Step 2500 couples a mobile device with an in-vehicle information/entertainment system. Step 2502 adapts a user interface experience associated with the mobile device to a user interface experience associated with the in-vehicle information/entertainment system. Adaptations can take place in any suitable way. For example, a pivot control on the mobile device can be adapted from using a scrollable list of pivot items to using a list-type visualization in which all views are visible at the same time. Alternately or additionally, list controls on the mobile device can be adapted from using a scrollable list to using a paging model in order for the user to page through multiple items at a time. Further adaptations can include, by way of example and not limitation, restricting media element controls from enabling both audio and video on the mobile device to enabling only audio to be played on the console of the in-vehicle information/entertainment system. Alternately or additionally, various grid control adaptations can be made to adapt the grid control navigation experience from a somewhat free and unpredictable experience on the mobile device, to a more linear, serialized and predictable navigation experience as noted above.

Adaptive User Interface Using Multiple Screens

Figure 26:
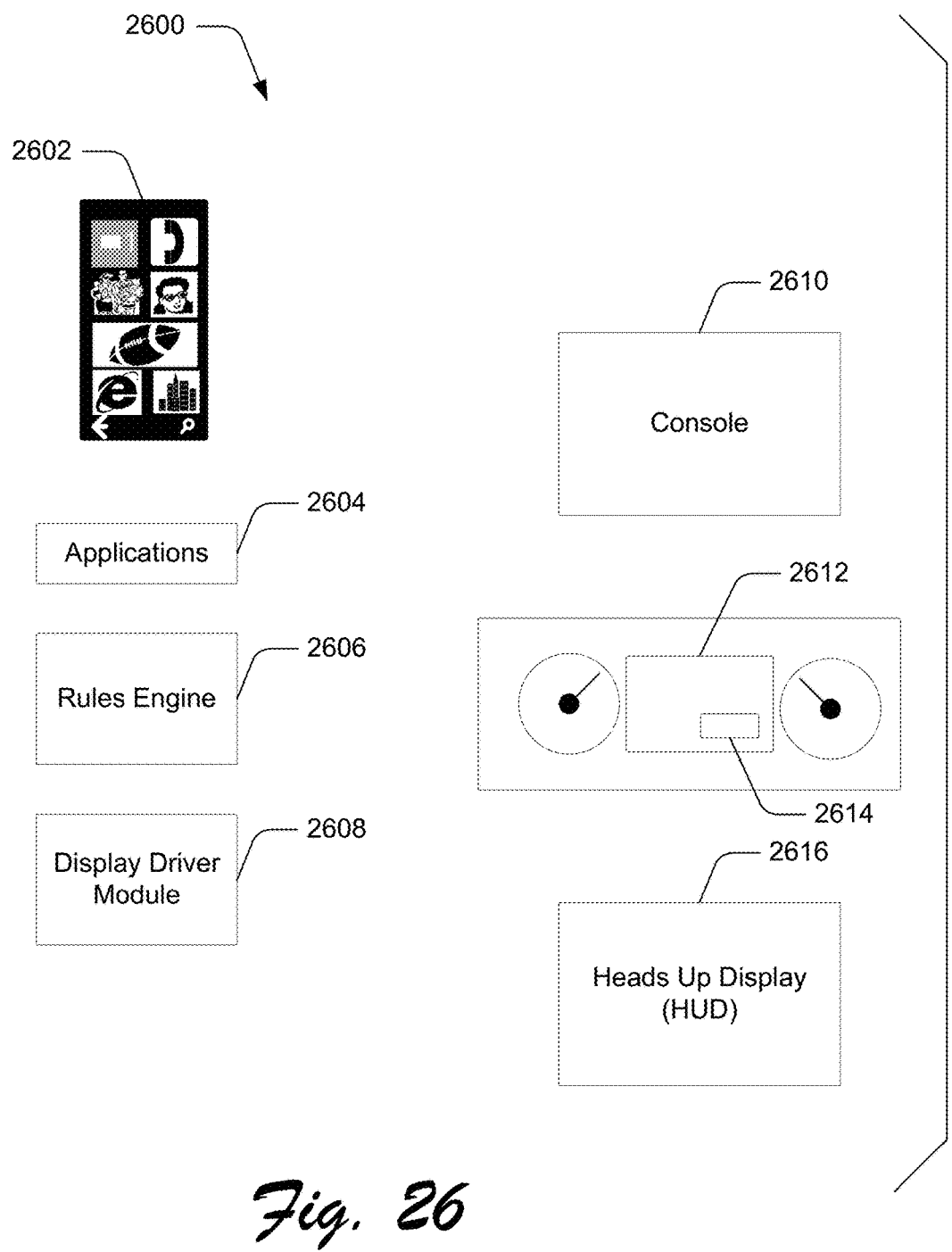
FIG. 26 illustrates a system in accordance with one or more embodiments.

In one or more embodiments, the mobile device is able to render to multiple different screen types that might be part of a vehicle's hardware. For example, various screen types can include, by way of example and not limitation, screen types associated with a console such as that described above, a so-called cluster which may include one or more subscreens, a head's up display (HUD) in which content is rendered on the vehicle's windshield and the like. As an example, consider FIG. 26.

There, a system in accordance with one or more embodiments is shown generally at 2600. System 2600 includes a mobile device 2602 that includes, among other components, one or more applications 2604, a rules engine 2606, a display driver module 2608 and various different screen types including, by way of example and not limitation, a console 2610, a cluster 2612 (typically in the driver's dashboard and including a speedometer and other gauges), a sub screen 2614 within cluster 2612, and a heads-up display 2616.

In this example, applications 2604 can be written to be screen-type agnostic. By this is meant that application developers can write their applications to perform various types of functionality that results in renderable content being produced. The renderable content can be rendered to multiple different types of screens in accordance with properties and characteristics associated with the screens.

In operation, rules engine 2606 provides a container that includes various rules associated with the screen types that are present within a particular vehicle. Individual rules can specify properties and characteristics associated with content that is to be rendered on any one particular type of screen. This can include, by way of example and not limitation, content formatting rules, aesthetic rules, visual design rules, culturally relevant rules, geographically relevant rules, language specific rules, reading direction rules (e.g., right-to-left rules, left-to-right rules), driver seat configuration rules (e.g., left side/right side driver seat), voice interaction rules, and the like.

When an application, such as a media player application, is connected to the in-vehicle information/entertainment system, it produces renderable content that can be rendered to the multiple different types of screens. The rules engine 2606 can provide a set of rules that the application can use to format content for rendering on multiple different screen types. Alternately, the display driver module 2608 receives data and information from the application and works in concert with the rules engine 2606 to drive the display on one or more of the particular screen types.

For example, media content can be displayed on the display device of the console 2610, while notifications, alerts, and prompts can be provided to, and displayed by cluster 2612. The rules engine 2606 contains the rules for each particular screen type and, accordingly, can cause the application or display driver module 2608 to format data in an appropriate manner to be displayed on the different types of screens. In this manner, application developers can write applications to simply produce renderable content without regard for the type of screen on which the content is to be rendered. The rules engine 2606 and the application or display driver module 2608 work in concert to ensure that the content produced by any one particular application can be appropriately rendered to the various screens in a format that is appropriate for that screen type.

Having considered an adaptive user interface associated with multiple screens, consider now a universal command/control model in accordance with one or more embodiments.

Universal Command/Control Model

In the section just above, the notion of an adaptive user interface was described in connection with renderable content. The adaptive user interface can be further extended to the notion of so-called universal controls. That is, using the adaptive user interface model, application developers can develop their applications in a manner that is agnostic with respect to how controls are rendered. That is, controls can include both hard controls and soft controls. Such controls can include lists, selections, menus, buttons, pads, dials, and the like.

When the mobile device is coupled to the in-vehicle information/entertainment system and an application is launched, rules from rules engine 2806 indicate to the application constraints, properties, and characteristics of controls that are to be rendered on the various screen types. For example, the rules may indicate how many controls are to be rendered, control sizes, font sizes, and the like. Using the information ascertained from the rules engine, the application is then able to adapt its controls to fit within the screen sizes as defined by the rules that it receives. This means that the application need not be custom written and, as in the above example, greatly facilitates an application developer's job in writing applications. That is, the applications can be written for universal screen sizes that are part of the phone and the vehicle's system. A good example of the adaptability of controls appears in FIGS. 23 and 24 and the related discussion above.

Use of the rules engine in this regard also promotes flexibility in adapting user interface elements, such as controls, in the face of changes to regulations governing vehicle user interfaces. For example, if a regulatory change takes place which modifies the requirements of vehicle user interfaces, a simple change to the rules that appear in the rules engine 2606 can take place without requiring any applications to be rewritten. That is, application developers can now write their applications to a "universal control" rather than to particular applicable regulations.

Figure 27:
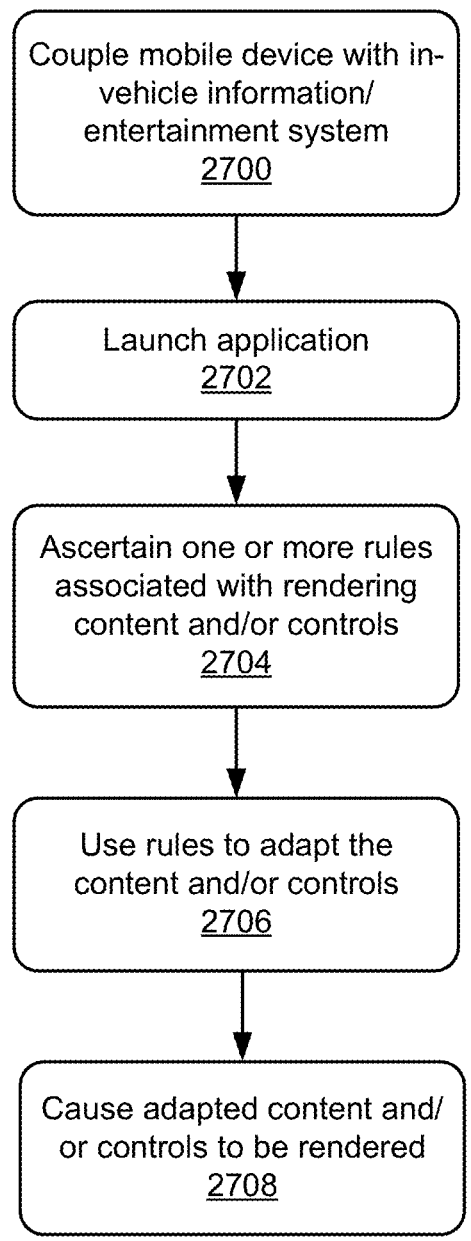
FIG. 27 is a flow diagram that describes steps in a method in accordance with one or more embodiments.

FIG. 27 is a flow diagram that describes steps in a method in accordance with one or more embodiments. The steps can be implemented in connection with any suitable hardware, software, firmware, or combination thereof. In at least some embodiments, the method can be implemented by a suitably configured system such as a mobile device and an in-vehicle information/entertainment system.

Step 2700 couples a mobile device with an in-vehicle information/entertainment system of a vehicle. Step 2702 launches an application on the mobile device. Step 2704 ascertains one or more rules associated with rendering content and/or controls on one or more screen types associated with the vehicle. This step can be performed in any suitable way. For example, in at least some embodiments, the step can be performed by an application executing on the mobile device. Alternately or additionally, this step can be performed by a display driver module that works in concert with the application to provide content and controls that are to be rendered on the screen types. Step 2706 uses the rules to adapt the content and/or controls that are to be rendered on screen types. Step 2908 causes the adapted content and/or controls to be rendered on the screen types.

Having considered the various embodiments described above, consider now a discussion of an example device that can be utilized to implement the embodiments described above. Various elements about to be described can be used to implement both the mobile device and aspects of the in-vehicle information/entertainment device.

Example Device

Figure 28:
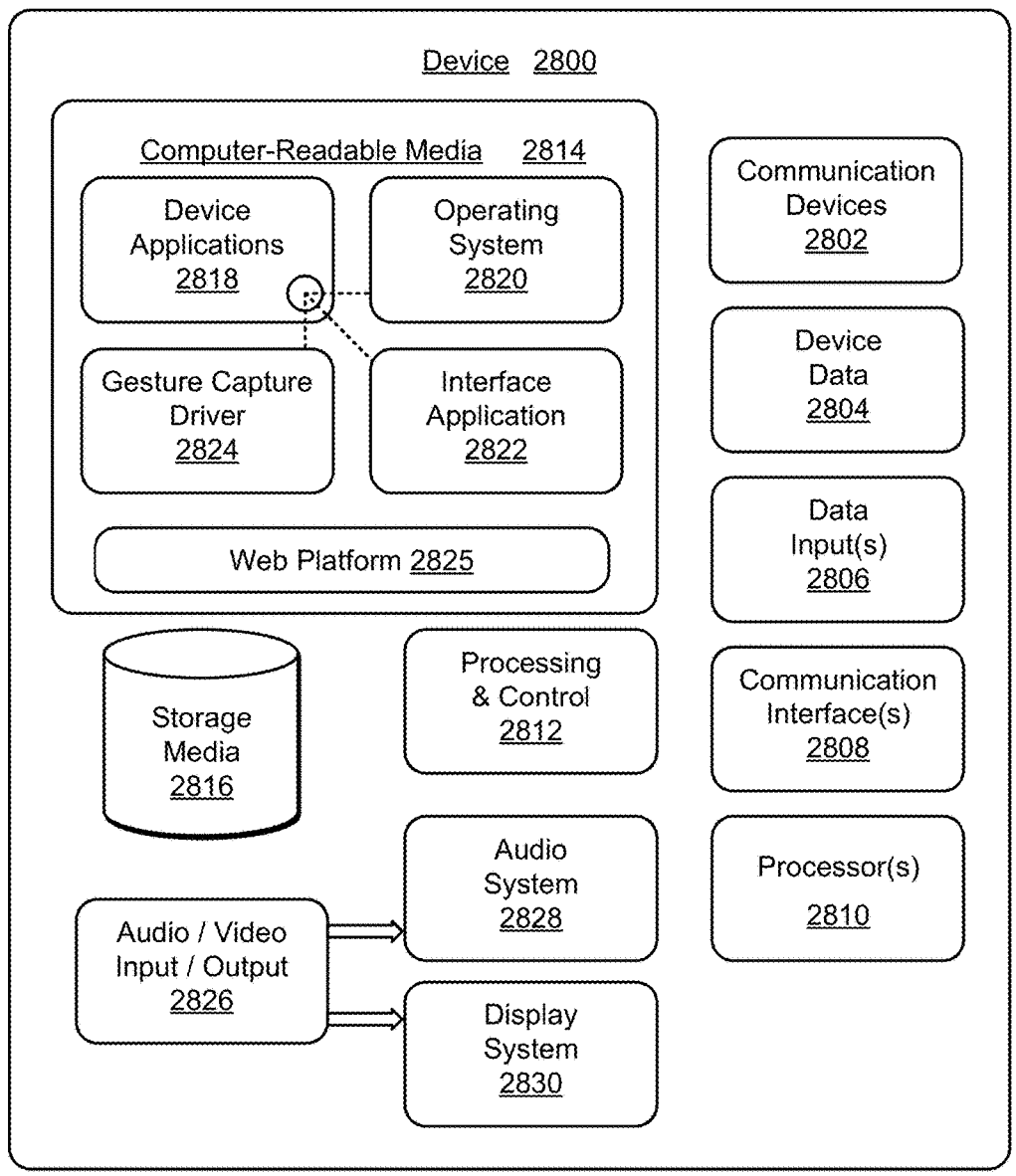
FIG. 28 illustrates an example computing device that can be utilized to implement various embodiments described herein.

FIG. 28 illustrates various components of an example device 2800 that can be implemented as any type of computing device that can be used in connection with embodiments described above.

Device 2800 includes communication devices 2802 that enable wired and/or wireless communication of device data 2804 (e.g., received data, data that is being received, data scheduled for broadcast, data packets of the data, etc.). The device data 2804 or other device content can include configuration settings of the device, media content stored on the device, and/or information associated with a user of the device. Media content stored on device 2800 can include any type of audio, video, and/or image data. Device 2800 includes one or more data inputs 2806 via which any type of data, media content, and/or inputs can be received, such as user-selectable inputs, messages, music, television media content, recorded video content, and any other type of audio, video, and/or image data received from any content and/or data source.

Device 2800 also includes communication interfaces 2808 that can be implemented as any one or more of a serial and/or parallel interface, a wireless interface, any type of network interface, a modem, and as any other type of communication interface. The communication interfaces and 2808 provide a connection and/or communication links between device 2800 and a communication network by which other electronic, computing, and communication devices communicate data with device 2800.

Device 2800 includes one or more processors 2810 (e.g., any of microprocessors, controllers, and the like) which process various computer-executable instructions to control the operation of device 2800 and to implement embodiments of the techniques described herein. Alternatively or in addition, device 2800 can be implemented with any one or combination of hardware, firmware, or fixed logic circuitry that is implemented in connection with processing and control circuits which are generally identified at 2812. Although not shown, device 2800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 2800 also includes computer-readable media 2814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 2800 and can also include a mass storage media device 2816.

Computer-readable media 2814 provides data storage mechanisms to store the device data 2804, as well as various device applications 2818 and any other types of information and/or data related to operational aspects of device 2800. For example, an operating system 2820 can be maintained as a computer application with the computer-readable media 2814 and executed on processors 2810. The device applications 2818 can include a device manager (e.g., a control application, software application, signal processing and control module, code that is native to a particular device, a hardware abstraction layer for a particular device, etc.). The device applications 2818 also include any system components or modules to implement embodiments of the techniques described herein. In this example, the device applications 2818 include an interface application 2822 and a gesture capture driver 2824 that are shown as software modules and/or computer applications. The gesture capture driver 2824 is representative of software that is used to provide an interface with a device configured to capture a gesture, such as a touchscreen, track pad, camera, and so on. Alternatively or in addition, the interface application 2822 and the gesture capture driver 2824 can be implemented as hardware, software, firmware, or any combination thereof. Additionally, computer readable media 2814 can include a web platform 2825 that provides browser functionality.

Device 2800 also includes an audio and/or video input-output system 2826 that provides audio data to an audio system 2828 and/or provides video data to a display system 2830. The audio system 2828 and/or the display system 2830 can include any devices that process, display, and/or otherwise render audio, video, and image data. Video signals and audio signals can be communicated from device 2800 to an audio device and/or to a display device via an RF (radio frequency) link, S-video link, composite video link, component video link, DVI (digital video interface), analog audio connection, or other similar communication link. In an embodiment, the audio system 2828 and/or the display system 2830 are implemented as external components to device 2800. Alternatively, the audio system 2828 and/or the display system 2830 are implemented as integrated components of example device 2800.

CONCLUSION

Various embodiments enable mobile devices, such as phones and the like, to integrate with an in-vehicle information/entertainment system to enable the user to control the in-vehicle information/entertainment system by way of their mobile phone. Users can leverage the functionality of their mobile phone to promote an in-vehicle experience which can be contextually tailored to the user's or the vehicle's context.

In at least some embodiments, a user can complete various tasks using multiple different modalities with smooth continuous modal handoffs between the modalities. The modalities can include voice, touch, and controls such as a jog dial. Smooth modal handoffs permit the user to easily change their input modality depending on their context.

Other embodiments can tailor the voice-only experience based on drive scenarios and the user's cognitive load. Yet other embodiments can tailor the user experience for jog dial and touchscreen modalities. Further embodiments can provide an adaptive user interface including an adaptive user interface that can operate in connection with multiple different types of screens, e.g., a phone screen, a cluster screen, a console screen, and a heads up display (HUD) screen, and the like. Still further embodiments provide a universal command/control model for multiple types of physical input including button jogs, capacitive dials, hard keys, pads, and the like.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising:
establishing a connection between a mobile device and an in-vehicle information/entertainment system;
receiving a communication from the mobile device, the communication being associated with an input of a first modality type comprising a voice communication that was received by the mobile device, the input comprising a query and associated with accomplishing a task of playing music;
listing a plurality of songs meeting the query;
receiving input of a second modality type that is different from the first modality type, the input of the second modality type selecting a song from the plurality of songs meeting the query and being associated with performing the task of playing music;
performing the task of playing music, wherein the task comprises playing the song;
during performance of the task, interrupting the task and presenting a user interface comprising an option selectable via a third modality type comprising touch that is different from the first and second modality types on the in-vehicle information/entertainment system associated with a different task; and
responsive to receiving selection of the option via the third modality type comprising touch, performing the different task;
wherein three different input modalities are used to engage the in-vehicle information/entertainment system by way of the mobile device: the first modality type comprising the voice communication, the second modality type, and the third modality type comprising touch and different from the first and second modality types.

2. The computer-implemented method of claim 1, wherein the input of the second modality type comprises a jog dial input received by way of a jog dial associated with a console of the in-vehicle information/entertainment system.

3. The computer-implemented method of claim 1, wherein at least some actions can be performed using the first modality type or one or more of the second modality type or the third modality type.

4. The computer-implemented method of claim 1, wherein at least some actions can be performed using the first modality type or one or more of the second modality type or the third modality type, wherein the first modality type comprises voice input.

5. The computer-implemented method of claim 1, wherein at least one of the first, second, or third modality types enables navigation of objects that are rendered on a console of the in-vehicle information/entertainment system.

6. The computer-implemented method of claim 1, wherein at least one of the first, second, or third modality types enables navigation of objects that are rendered on a console of the in-vehicle information/entertainment system, and wherein the objects comprise tiles.

7. The computer-implemented method of claim 1, wherein the input of the first modality type comprises voice input, and the input of the second modality type is configured to disambiguate an ambiguity associated with the input of the first modality type.

8. The computer-implemented method of claim 1, wherein the in-vehicle information/entertainment system is configured to enable actions associated with one particular task can be interrupted when a user's context indicates that performable actions associated with a different task are available for performance.

9. The method of claim 1 further comprising:
storing context information about the task; and
after interrupting the task, resuming the task where the task was left off with the stored context information.

10. The computer-implemented method of claim 7, wherein the ambiguity comprises a plurality of contacts that match a search.

11. One or more random-access memories, read-only memories, optical discs, flash memories, or hard disk memories storing computer-readable instructions which, when executed, perform operations comprising:
establishing a connection between a mobile device and an in-vehicle information/entertainment system of a vehicle;

receiving a communication from the mobile device, the communication being associated with an input of a first modality type that was received by the mobile device, the input being associated with accomplishing a task;

performing one or more actions associated with the task; and causing, by the mobile device, a user interface to appear on the in-vehicle information/entertainment system;

via the user interface from the mobile device, receiving, by the in-vehicle information/entertainment system, input of a second modality type that is different from the first modality type, the input of the second modality type being associated with performing the task; and performing one or more actions associated with the input of the second modality type for performing the task;

wherein the in-vehicle information/entertainment system is configured to receive input of at least a third modality type that is different from the first and second modality types to perform one or more actions associated with the task or one or more actions associated with a different task; and wherein the input of the first modality type comprises voice input, and the input of the second modality type is configured to disambiguate between two contacts that match in a search, wherein the search results in an ambiguity and is performed via input of the first modality type.

12. The one or more random-access memories, read-only memories, optical discs, flash memories, or hard disk memories of claim 11, wherein the input of the first modality type comprises voice input, and wherein the input of the second modality type comprises touch input received by way of a console of the in-vehicle information/entertainment system.

13. The one or more random-access memories, read-only memories, optical discs, flash memories, or hard disk memories of claim 11, wherein the input of the first modality type comprises voice input, and wherein the input of the second modality type comprises a jog dial input received by way of a jog dial associated with a console of the in-vehicle information/entertainment system.

14. The one or more random-access memories, read-only memories, optical discs, flash memories, or hard disk memories of claim 11, wherein at least some actions can be performed using the first modality type or one or more of the second modality type or the third modality type.

15. The one or more random-access memories, read-only memories, optical discs, flash memories, or hard disk memories of claim 11, wherein at least one of the first, second, or third modality types enables navigation of objects that are rendered on a console of the in-vehicle information/entertainment system.

16. The one or more random-access memories, read-only memories, optical discs, flash memories, or hard disk memories storing computer-readable instructions of claim 11, wherein the operations further comprise:

determining, by the mobile device, a driving state; and for a particular task arising during the driving state and ordinarily implemented by providing an input modality on a screen of the mobile device or a display device of the in-vehicle information/entertainment system, responsive to determining the driving state, implementing a voice input modality for the particular task.

17. A vehicle comprising:

an in-vehicle information/entertainment system comprising a display screen of a screen type and configured to be operably connected to a mobile device and, when connected to the mobile device, perform operations comprising:

receiving a communication from the mobile device, the communication being associated with an input of a first modality type that was received by the mobile device, the input being associated with accomplishing a task, wherein the task comprises playing music, the first modality type comprises voice input, and the voice input comprises a query associated with playing music;

listing a plurality of songs meeting the query;

causing, by the mobile device, a user interface to appear on the in-vehicle information/entertainment system;

via the user interface from the mobile device, receiving, by the in-vehicle information/entertainment system, input of a second modality type that is different from the first modality type, the input of the second modality type selecting a song from the plurality of songs meeting the query and being associated with performing the task, wherein the second modality type comprises jog dial;

performing the task of playing music, wherein the task comprises playing the song selected via the second modality type;

during performance of the task, interrupting the task and presenting a user interface comprising an option selectable via a third modality type comprising touch that is different from the first and second modality types on the in-vehicle information/entertainment system and is associated with a different task; and responsive to receiving selection of the option via the third modality type comprising touch, performing the different task.

* * * * *